US009098760B2

(12) United States Patent
Saito et al.

(10) Patent No.: US 9,098,760 B2
(45) Date of Patent: *Aug. 4, 2015

(54) FACE RECOGNIZING APPARATUS AND FACE RECOGNIZING METHOD

(75) Inventors: Hiroo Saito, Tokyo (JP); Hiroshi Sukegawa, Kanagawa (JP); Osamu Yamaguchi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 13/611,403

(22) Filed: Sep. 12, 2012

(65) Prior Publication Data

US 2013/0070973 A1   Mar. 21, 2013

(30) Foreign Application Priority Data

Sep. 15, 2011   (JP) .................................. 2011-202454
Sep. 15, 2011   (JP) .................................. 2011-202455

(51) Int. Cl.
*G06K 9/00*   (2006.01)
*G06K 9/03*   (2006.01)

(52) U.S. Cl.
CPC ............ *G06K 9/036* (2013.01); *G06K 9/00228* (2013.01)

(58) Field of Classification Search
None
See application file for complete search history.

(56) References Cited

U.S. PATENT DOCUMENTS

| 7,197,165 | B2* | 3/2007 | Ryan .............................. 382/103 |
| 8,432,357 | B2* | 4/2013 | Ogura et al. .................... 345/158 |
| 8,462,226 | B2* | 6/2013 | Kameyama ................. 348/222.1 |
| 2001/0033675 | A1* | 10/2001 | Maurer et al. ................. 382/103 |
| 2005/0100195 | A1* | 5/2005 | Li ................................... 382/118 |
| 2005/0226471 | A1* | 10/2005 | Singh et al. .................... 382/118 |
| 2006/0093185 | A1* | 5/2006 | Kato et al. ...................... 382/103 |
| 2006/0120571 | A1* | 6/2006 | Tu et al. ......................... 382/118 |
| 2006/0210168 | A1* | 9/2006 | Kim et al. ...................... 382/203 |
| 2007/0031010 | A1* | 2/2007 | Sukegawa et al. ............. 382/118 |
| 2007/0047824 | A1* | 3/2007 | Ito ................................... 382/228 |
| 2007/0195996 | A1* | 8/2007 | Kitamura ....................... 382/103 |
| 2007/0258646 | A1* | 11/2007 | Sung et al. ..................... 382/191 |

(Continued)

FOREIGN PATENT DOCUMENTS

JP   H09-251534 A   9/1997
JP   2001034756   2/2001

(Continued)

OTHER PUBLICATIONS

Official Action issued in related Korean Patent Application No. 10-2012-0100304 mailed Jul. 25, 2013, 4 pages.

(Continued)

*Primary Examiner* — Stephen R Koziol
*Assistant Examiner* — Sean Conner
(74) *Attorney, Agent, or Firm* — Baker Botts L.L.P.

(57) ABSTRACT

According to one embodiment, a face recognizing apparatus includes: a storage unit; an input unit; a face detector; an extractor; and a recognizing unit. The storage unit stores face feature information on a face feature of each person. The input unit receives image information including at least a face of a person. The face detector detects a face region of the face of the person from the image information received by the input unit. The extractor extracts face feature information on a face feature from the face region detected by the face detector. The recognizing unit recognizes the person in the image information received by the input unit based on the feature information extracted by the extracting unit and the face feature information stored in the storage unit.

12 Claims, 24 Drawing Sheets

(56) References Cited

U.S. PATENT DOCUMENTS

| | | | |
|---|---|---|---|
| 2007/0292019 A1* | 12/2007 | Terakawa | 382/159 |
| 2008/0013837 A1* | 1/2008 | Porter et al. | 382/218 |
| 2008/0095402 A1 | 4/2008 | Kochi et al. | |
| 2009/0087038 A1* | 4/2009 | Okada et al. | 382/118 |
| 2009/0091633 A1* | 4/2009 | Tamaru | 348/208.14 |
| 2009/0096871 A1* | 4/2009 | Kuwano et al. | 348/169 |
| 2009/0202114 A1* | 8/2009 | Morin et al. | 382/118 |
| 2009/0220157 A1* | 9/2009 | Kato et al. | 382/201 |
| 2010/0007763 A1* | 1/2010 | Yokohata | 348/222.1 |
| 2010/0054550 A1* | 3/2010 | Okada | 382/118 |
| 2010/0111363 A1* | 5/2010 | Kelly et al. | 382/103 |
| 2010/0246905 A1* | 9/2010 | Yuasa et al. | 382/118 |
| 2011/0074970 A1 | 3/2011 | Sukegawa | |
| 2012/0059239 A1* | 3/2012 | Yamaguchi | 600/407 |
| 2012/0146789 A1* | 6/2012 | De Luca et al. | 340/540 |
| 2012/0147167 A1* | 6/2012 | Manson et al. | 348/77 |
| 2013/0010095 A1* | 1/2013 | Aoki et al. | 348/77 |
| 2013/0022277 A1* | 1/2013 | Morishita | 382/201 |
| 2014/0056490 A1* | 2/2014 | Kawahara | 382/118 |
| 2014/0079299 A1* | 3/2014 | Sukegawa et al. | 382/118 |

FOREIGN PATENT DOCUMENTS

| | | |
|---|---|---|
| JP | 2003-346157 A | 12/2003 |
| JP | 2004-246456 A | 9/2004 |
| JP | 2007-148988 A | 6/2007 |
| JP | 2007-243335 A | 9/2007 |
| JP | 2008-003749 A | 1/2008 |
| JP | 2008-005109 A | 1/2008 |
| JP | 2008-287399 A | 11/2008 |
| JP | 2009-000367 A | 1/2009 |
| JP | 2009-053916 A | 3/2009 |
| JP | 2010-049413 A | 3/2010 |
| JP | 2010-108200 A | 5/2010 |
| JP | 2010122994 | 6/2010 |
| JP | 2011-123563 A | 6/2011 |
| KR | 10-2007-0034966 A | 3/2007 |

OTHER PUBLICATIONS

Osamu Yamaguchi, Kazuhiro Fukui and Ken-ichi Maeda: "Face Recognition System using Temporal Image Sequence", The Institute of Electronics Information and Communication Engineers Research Report PRMU, vol. 97, No. 113, pp. 17-24 (1997).

Office Action issued in related Japanese Patent Application No. 2011-202455 mailed Oct. 21, 2014, 9 pages. (with translation.).

Office Action issued in related Japanese Patent Application No. 2011-202454 mailed Dec. 9, 2014, 7 pages. (with translation.).

* cited by examiner

FACE RECOGNIZING APPARATUS AND FACE RECOGNIZING METHOD

CROSS-REFERENCE TO RELATED APPLICATIONS

This application is based upon and claims the benefit of priority from: Japanese Patent Application No. 2011-202454, filed on Sep. 15, 2011; and Japanese Patent Application No. 2011-202455, filed on Sep. 15, 2011, the entire contents of which are incorporated herein by reference.

FIELD

Embodiments relate to a face recognizing apparatus and a face recognizing method.

BACKGROUND

Conventionally, there has been proposed a technology of authenticating a person based on preliminarily stored feature information of a face image, from a face region of a person included in video data captured by a monitoring camera or the like. In this case, feature information is extracted from the face region included in the video data, and the extracted feature information is compared with the preliminarily stored feature information to perform the person authentication.

In general, when photographing is performed by a monitoring camera or the like, the accuracy of person identification or recognition improves as the resolution of a photographed face region increases.

Also, since the resolution of a face region varies according to the conditions of photographing by a monitoring camera or the like, there may be a case where the resolution of the face region decreases. Recently, there have been proposed technologies of improving recognition accuracy even in the case where the resolution of a face region is low.

However, frequently, the size of a face of a person viewed in captured video data varies depending on how the monitoring camera is used. When there are different sizes of face regions viewed in video data, there will obviously be a difference in the resolution of faces of the people, thus degrading authentication accuracy.

For example, when the resolution of a face region of a person is low, there is a problem in that proper recognition results may not be obtained by a high-resolution recognition technique that is generally considered to be high in recognition accuracy. Therefore, a recognition technique applicable also to low resolution may be used. However, in this case, there is a problem in that high recognition accuracy may not be obtained when the resolution of a face region is high.

A monitoring camera installed in a high place captures an image while looking down from the high place. Therefore, when a person is close to the monitoring camera, the size (resolution) of a captured face is large but it is difficult for a face direction to be a front direction. When a person is remote from the monitoring camera, the direction of a face is likely to be a front direction but the size of a face is apt to decrease. Therefore, even when a monitoring camera captures a face of a person over a plurality of frame images, all the captured frame images are not necessarily frame images that can be used to perform high-accuracy person authentication, and the captured frame images may also include frame images reducing authentication accuracy.

DETAILED DESCRIPTION

According to an embodiment, a face recognizing apparatus comprises: a storage unit; an input unit; a face detector; an extractor; and a recognizing unit. The storage unit stores face feature information on a face feature of each person. The input unit receives image information including at least a face of a person. The face detector detects a face region of the face of the person from the image information received by the input unit. The extractor extracts face feature information on a face feature from the face region detected by the face detector. The recognizing unit recognizes the person in the image information received by the input unit based on the feature information extracted by the extracting unit and the face feature information stored in the storage unit.

Hereinafter, a face recognizing apparatus and a face recognizing method according to embodiments will be described in detail with reference to the accompanying drawings. The face recognizing apparatus and the face recognizing method according to the embodiments identify a person. In particular, the face recognizing apparatus and a face recognizing method detect a region of a face captured from a photographed target, extract person information by using a position of the face or a feature of the face, determine whether the extracted person information matches pre-registered person information, and perform person recognition according to the determination result. Although a process of implementing person recognition by detecting a face region as a person region and using face feature information is described in the present embodiment, person recognition may also be implemented by using a technology of detecting an entire person region in addition to a face and using a size thereof (Watanabe et al., "Co-occurrence Histograms of Oriented Gradients for Pedestrian Detection, In Proceedings of the 3rd Pacific-Rim Symposium on Image and Video Technology" (PSIVT2009), pp. 37-47). It will be apparent that the present disclosure is not limited to the technology described in the present embodiment, as long as it is a technology of detecting a person region and a technology of measuring feature information in the person region.

Figure 1:
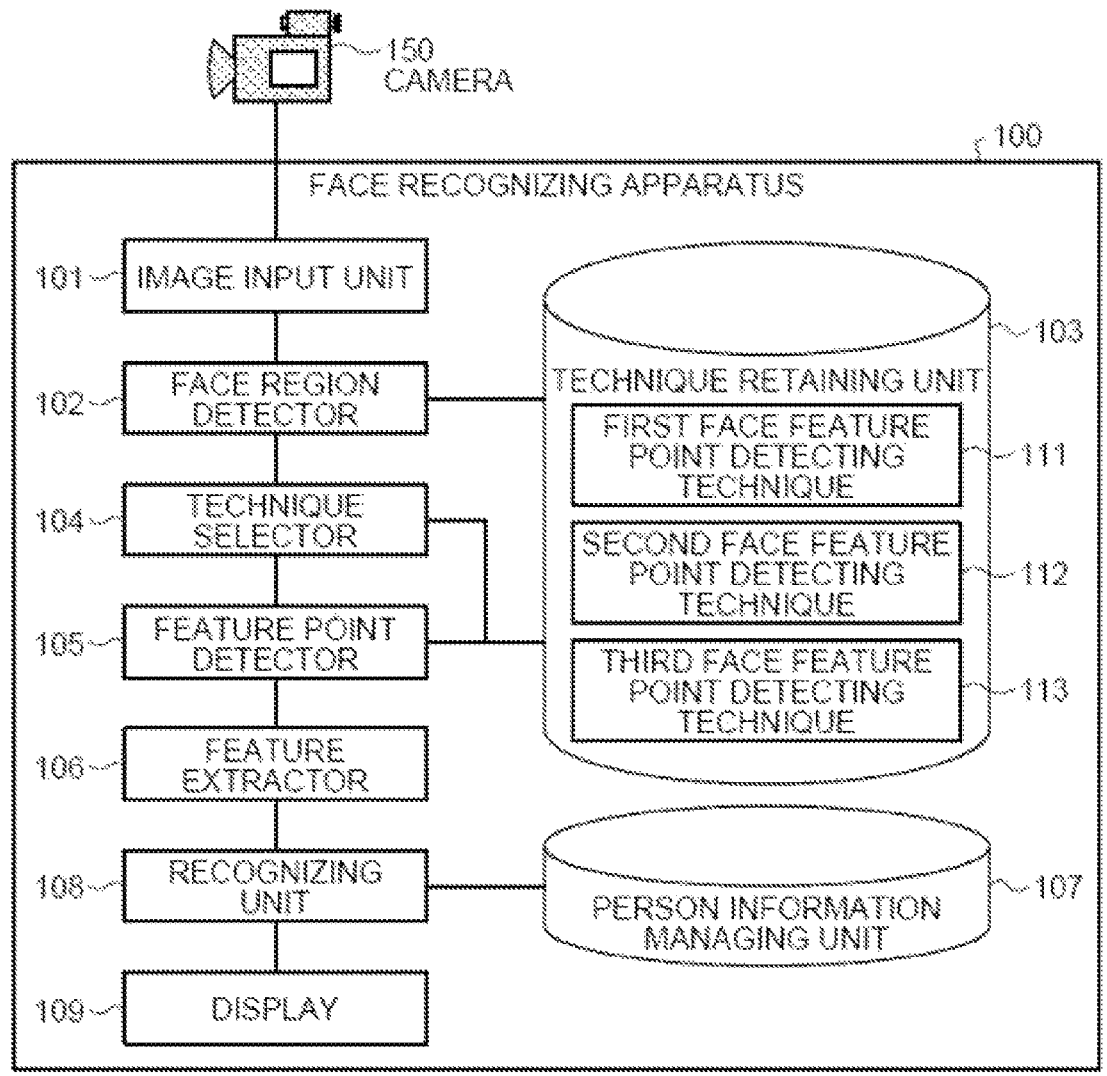
FIG. 1 is an exemplary diagram of a block configuration of a face recognizing apparatus according to a first embodiment.

FIG. 1 is a diagram illustrating a block configuration of a face recognizing apparatus 100 according to a first embodiment. As illustrated in FIG. 1, the face recognizing apparatus 100 includes an image input unit 101, a face region detector 102, a technique retaining unit 103, a technique selector 104, a feature point detector 105, a feature extractor 106, a person information managing unit 107, a recognizing unit 108, and a display 109. Also, the face recognizing apparatus 100 performs person authentication based on an image captured from a camera 150.

In the face recognizing apparatus 100 according to the present embodiment, a person is recognized from image data captured by the camera 150 or the like, based on preliminarily managed face feature information. In this case, in the face recognizing apparatus according to the present embodiment, an appropriate face feature point detecting technique is selected according to a size (resolution) of a face region of input image data. Accordingly, the recognition accuracy of face recognition can be maintained, corresponding to a resolution difference of a face region.

The camera 150 performs captures a predetermined region. For example, the camera 150 is a monitoring camera capturing an entrance and exit area of a passage road, or the like, and generates image data corresponding to the captured result. Then, the image input unit 101 inputs the image data from the camera 150.

The camera 150 may be installed in at least one place or at a plurality of points. Also, the camera 150 is used to receive a face image of a person present in a predetermined region, and is called, for example, an ITV (industrial television) camera. The camera 150 generates image data by digitizing optical information obtained through a camera lens by an A/D converter, and outputs the image data to the face recognizing apparatus 100.

Also, in the case of digital image data including a face region, since it is a face authentication target, the face recognizing apparatus 100 may perform face authentication by importing still image data captured by a digital still camera through a medium, or may perform face authentication on a digital image scanned from a paper medium or a picture by using a scanner.

Then, the face recognizing apparatus 100 according to the present embodiment performs face authentication on a person based on the generated image data, and determines whether the person is pre-registered in the person information managing unit 107. According to the authentication result, the face recognizing apparatus 100 may perform detection of a suspicious person, or may control permitting/prohibiting passage.

The face recognizing apparatus 100 according to the present embodiment may be used to detect a suspicious person or control permitting/prohibiting passage according to the person authentication. However, the face recognizing apparatus 100 is not limited to such a control, and may perform any control as long as it uses the person recognition result. For example, the face recognizing apparatus 100 may be used to search a customer from customer data, search a suspicious person from a suspicious person database, perform identification of the subject person in ID card update, or prevent a double issue in a new issue. Also, the face recognizing apparatus 100 may be applicable to a portable phone or a digital still camera that detects a face from an image signal and controls a focus or the like.

Figures 2, 3:
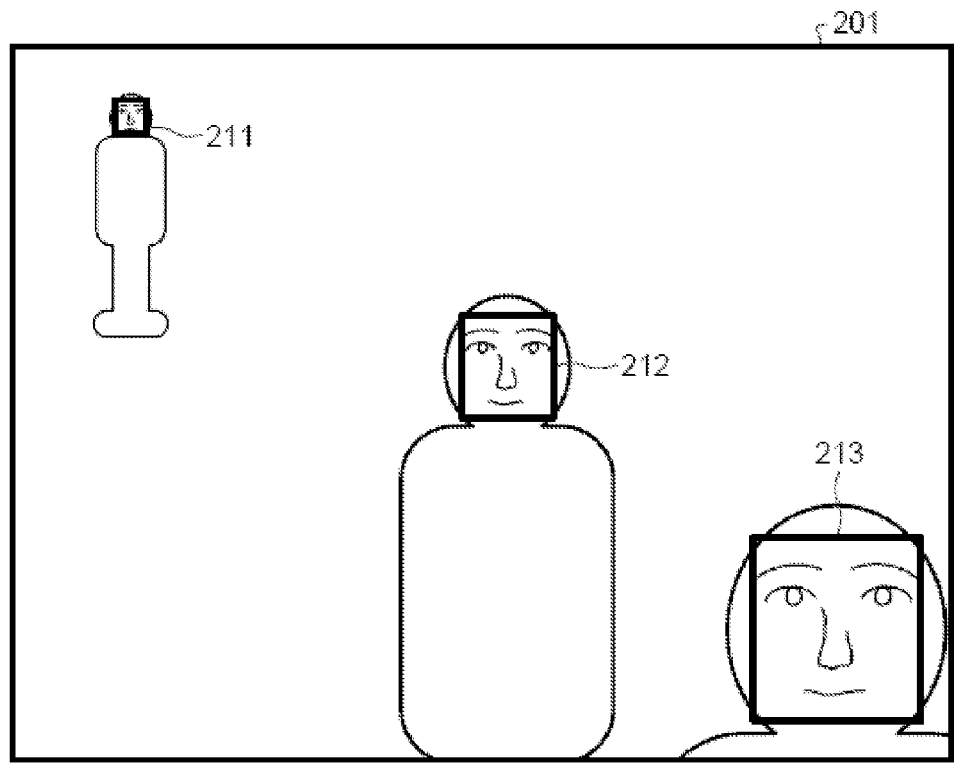
FIG. 2 is a diagram illustrating an example of image data input from a camera in the first embodiment.
FIG. 3 is an exemplary diagram illustrating characteristics of face feature point detecting techniques retained by a technique retaining unit in the first embodiment.

FIG. 2 is a diagram illustrating an example of image data 201 input from the camera 150. As illustrated in FIG. 2, the image data may include face regions of various sizes (for example, regions 211, 212, and 213). When a face is viewed as a small in an image (for example, in the case of the region 211), a resolution of an image corresponding to a face region is very low. Therefore, when a conventional technique suitable for enhancing the resolution is used to perform face recognition on an image that has a small face size and a low resolution, there is a problem in that an accurate position may not be detected by face feature point detection and a position of the feature point is apt to be deviated. Also, when feature point extraction processing is performed, necessary feature information may not be acquired in the case of some resolutions and all faces of an identification target become similar feature information, thus degrading identification accuracy.

Therefore, the face recognizing apparatus 100 according to the present embodiment uses different face feature point detecting techniques according to the sizes of face regions included in image data. In the present embodiment, it is necessary to perform detection of a region representing a face of a person (hereinafter referred to as a face region), which is included in image data, before performing detection of a face feature point.

The face region detector 102 detects a face region of a person from image data input by the image input unit 101. The face region detector 102 according to the present embodiment obtains coordinates of a face region in the received image data by using luminance information on the image data. Any technique may be used as a face region detecting technique. The present embodiment performs face region detection by using, for example, a technique described in a literature (MITA, Takeshi, et al.: "Joint Haar-like Features Based on Concurrence Suitable for Face Detection", the institute of electronics information and communication engineers Journal (D), vol. J89-D, 8, pp. 1791-1801 (2006)). As an example of another detection technique, there may be a technique of obtaining correlation values while shifting a prepared template within input image data, and detecting a position providing the highest correlation value as a face region, or a technique of using a face extracting method using an eigenspace method, a subspace method, or the like.

Also, the shape of a face region detected may be any shape, and the shape of a face region may vary according to a detection result of the direction or size of a face. For the purpose of easy description, the present embodiment detects a rectangular face region. Then, coordinates of vertexes of the rectangular shape are taken as the detection results of a face region.

In case of image data captured by a monitoring camera or the like, it is assumed that a detected face of the same person will be viewed continuously over a plurality of frames. For this reason, it is necessary to track a face of the person so that these can correspond to the same person. This tracking may be implemented by using, for example, a technique of estimating which position in a next frame a face detected by using an optical flow is present at, and matching the same thereto. Then, in order to recognize a person, the feature extractor 106 may select at least one appropriate image among face regions of a plurality of frames corresponding to the same person, and extract face feature information from the selected face region. Also, the feature extractor 106 may extract face feature information whenever a size of a face region is increased, so that any number of pieces of image data may be used for detection until a face region of the maximum size is detected.

The technique retaining unit 103 retains a plurality of detecting techniques for detecting a face feature from a face region detected by the face region detector 102. Here, the detecting techniques differ from each other in roughness of detection processing. The technique retaining unit 103 according to the present embodiment retains three types of face feature point detecting techniques; however, the number of detecting techniques retained is not limited thereto. For example, the technique retaining unit 103 may retain four or more types of detecting techniques and may retain two types of detecting techniques.

FIG. 3 is a diagram illustrating the characteristics of face feature point techniques retained by the technique retaining unit 103. As illustrated in FIG. 3, the technique retaining unit 103 according to the present embodiment retains a first face feature point detecting technique, a second face feature point detecting technique, and a third face feature point detecting technique. Also, the respective face feature point detecting techniques have different characteristics as illustrated in FIG. 3.

Since the first face feature point detecting technique is the roughest in detection processing among three types of detecting techniques, the first face feature point detecting technique is robust against a low resolution but has lowest recognition accuracy. The second face feature point detecting technique is second roughest in the detection processing among three types of detecting techniques, is second-robust against a low resolution, and has second-highest recognition accuracy. Since the third face feature point detecting technique is the finest in the detection processing among three types of detecting techniques, the third face feature point detecting technique is weak against a low resolution but has highest recognition accuracy when the resolution is high. In the present embodiment, it is assumed that an optimal face feature point detecting technique among three types of face feature point detecting techniques is used according to the size of a face region detected.

The technique selector 104 selects a face feature point detecting technique to be used by the feature point detector 105 to be described later, from the face feature point detecting techniques retained in the technique retaining unit 103, based on an image size of a face region detected by the face region detector 102. Any technique may be used to select a face feature point detecting technique. In the present embodiment, the number of pixels representing a horizontal width and a vertical width is calculated from the coordinates of vertexes of a rectangular shape representing a face region, and a face feature point detecting technique is selected based on whether the calculated number of pixels is equal to or greater than a predetermined threshold value. Accordingly, a face feature point detecting technique can be easily selected.

When three types of face feature point detecting techniques are retained, the technique selector 104 selects a face feature point detecting technique by using two types of resolution threshold values. Two types of resolution threshold values are A and B (B<A). Then, if a calculated horizontal width (or vertical width) is smaller than B, the technique selector 104 selects the first face feature point detecting technique. In addition, if a calculated horizontal width (or vertical width) is equal to or greater than B and smaller than A, the technique selector 104 selects the second face feature point detecting technique; and if a calculated horizontal width (or vertical width) is equal to or greater than A, the technique selector 104 selects the third face feature point detecting technique. The present embodiment is not limited to selection by a threshold value, and may also use a technique of learning which technique to select statistically by using a shift of a face size in a time-axis direction.

By using a face feature point detecting technique selected by a technique selector 104, the feature point detector 105 detects a position of a face part such as an eye, a nose, or the like, as a feature point of a face, from a face region detected by the face region detector 102.

Figure 4:
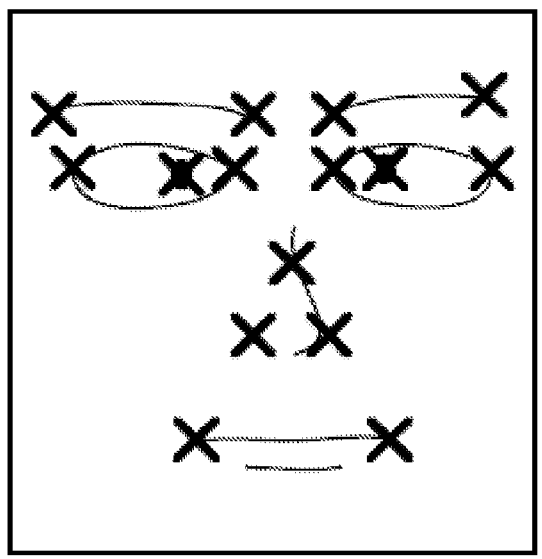
FIG. 4 is a diagram illustrating an example of feature points detected through various face feature point detecting techniques by a feature point detector, in the first embodiment.

According to the present embodiment, the first face feature point detecting technique, the second face feature point detecting technique, and the third face feature point detecting technique are different from each other in terms of detection roughness but are the same in terms of feature points to be detected (for example, the inner corner of an eye, the corner of an eye, and the like) and the number of feature points. FIG. 4 is a diagram illustrating an example of feature points detected through various face feature point detecting techniques by the feature point detector 105. In FIG. 4, a point represented by "x" is an example of the feature points. As illustrated in FIG. 4, the feature point detector 105 according to the present embodiment detects fifteen feature points.

Accordingly, even when face feature information is extracted by using any one of the first face feature point detecting technique, the second face feature point detecting technique, and the third face feature point detecting technique, the recognizing unit 108 can perform person authentication by comparison with face feature information of each person stored in the person information managing unit 107. Next, each face feature point detecting technique will be described in detail.

It is assumed that the first face feature point detecting technique will be used when a face region is low in resolution such that fine structure information of a face cannot be observed. The first face feature point detecting technique prepares a plurality of average models of face feature point coordinates to be detected (wire frames) according to the directions of a face. Then, when the feature point detector 105 performs detection processing, the first face feature point detecting technique compares a luminance value included in a face region with the prepared average models (wire frames) and fits the wire frame with the highest matching degree. In this case, the first face feature point detecting technique fits the wire frame to a point that is most likely to be a face, by also considering the direction of a face and the like. Then, the feature point detector 105 detects a feature point of a face according to the fitted wire frame.

A procedure in the case where the feature point detector 105 uses the first face feature point detecting technique will be described in detail. For example, a plurality of face images of low resolution are extracted with respect to each face direction, and clustering is performed with respect to each face direction prior to KL development, so that a subspace by a face pattern for each face direction is created. The first face feature point detecting technique retains the subspace by the face pattern as an average model of a face. Then, when performing detection by the first face feature point detecting technique, the feature point detector 105 uses a subspace method to determine which of the retained face patterns the face region output from the input image is most similar to. In this case, since the face patterns are retained with respect to the respective directions, the feature point detector 105 can also determine which of the face directions the direction is most similar to. In this manner, the feature point detector 105 determines a face direction based on a subspace allocated the highest similarity by a subspace method, and detects a position of a face feature point according to the wire frame fitted to the determined direction. In addition, since detailed structure information is not considered, it may be preferable that the first face feature point detecting technique is executed only in the case of low resolution.

The second face feature point detecting technique has the high detection position accuracy of the face feature point as compared to the first face feature point detecting technique, but does not have a detailed position matching accuracy for each face part as compared to the third face feature point detecting technique which will be described later. As the second face feature point detecting technique, tracking of a facial expression by a so-called AAM (active appearance model) referring to a literature (Cootes. T. F, Walker. K, Taylor. C. J, "View-based active appearance models", Image and Vision Computing 20, pp. 227-232, 2002) may be considered. The feature point detector 105 may detect a position of a face feature point by tracking a facial expression by using the second face feature point detecting technique.

The third face feature point detecting technique can be used when the resolution of a face region is sufficiently high. The third face feature point detecting technique detects a face feature point by using the luminance distribution information or the shape information of a face feature point. The third face feature point detecting technique provides the highest detection position accuracy among three types of face feature point detecting techniques when the resolution of a face region is sufficiently high.

As the third face feature point detecting technique, a technique described in a literature (FUKUI Kazuhiro, YAMAGUCHI Osamu: "Face Feature Point Extraction by Combination of Shape Extraction and Pattern Check", the institute of electronics information and communication engineers Journal (D), vol. J80-D-II, No. 8, pp. 2170-2177 (1997)) is applied. Accordingly, feature points such as an eye, a nasal cavity, tip of the mouth, and the like can be detected. Also, for detection of a feature point representing a mouth region, a technique described in a literature (YUASA Mayumi, NAKAJIMA Akiko: "Digital Make System Based on High-accuracy Face Feature Point Detection", Proceedings of the 10th Symposium on Image Sensing, pp. 219-224 (2004)) may be applied. Even when any technique is used as the third face feature point detecting technique, information that can be treated as a two-dimensional array image may be acquired and a face feature point may be detected from the obtained information.

Also, in order to detect a face feature point even in the case of wearing a mask, sunglasses or a hat, the feature point detector 105 according to the present embodiment may use the above various face feature point detecting techniques to preliminarily learn a template with a face pattern in the case where a portion of a face is covered with sunglasses, a mask, or a hat. Also, even when the feature point detector 105 may not detect all feature points of a face, if some feature points of the face are detected with sufficient evaluation values, the feature point detector 105 predicts the other feature points based on the detected feature points by using a two-dimensional or three-dimensional face model. Also, when a feature point is covered with a mask, a hat, or sunglasses such that the feature point may not be detected at all, the feature point detector 105 may previously learn the whole pattern of a face covered with a mask, a hat, or sunglasses, and predict a position of a face feature point in a detected face region based on the whole pattern of the face. Also, when a plurality of faces are present in image data, the feature point detector 105 may be configured to perform the same processing on each face region.

From the face feature point detected by the feature point detector 105, the feature extractor 106 extracts feature information (hereinafter, referred to as face feature information) indicating a face feature by which a captured face of an individual can be identified. Accordingly, the feature extractor 106 may extract face feature information using any one of various face feature point detecting techniques.

The feature extractor 106 outputs a sequence representing each face feature as the face feature information. The feature extractor 106 according to the present embodiment extracts a face region with a predetermined size and shape based on the coordinates of the face feature point (the position of a face feature part) detected by the feature point detector 105, and extracts shading information thereof as a feature amount representing a feature of a face. In the present embodiment, a shading value of an m×n pixel region is used as information, and the m×n-directional information is extracted as a feature amount vector.

The feature extractor 106 normalizes the feature amount vector and a length of the feature amount vector to 1 by a simple similarity method, calculates an inner product, and obtains a similarity degree representing a similarity between feature vectors. The relevant technique is implemented by using a subspace method described in a literature (Written by Erkki Oja and Translated by OGAWA Hidemitsu and SATO Makoto, "Pattern Recognition and Subspace Method", Industrial Book (Sangyotosho), 1986). Also, a technique of improving an accuracy by generating image data by intentionally changing the direction or state of a face by using a model with respect to a piece of face image information, which is described in a literature (TOSHIBA (KOZAKAYA Tatsuo): "Image Recognizing Apparatus, Method and Program", Japanese Patent Application Laid-Open No. 2007-4767), may also be applied. By using these techniques, face feature information can be extracted from a piece of image data.

On the other hand, the feature extractor 106 may perform higher-accuracy recognition processing by performing calculation based on video data by using plurality pieces of consecutive image data with respect to the same person. For example, a mutual subspace method described in a literature (FUKUI Kazuhiro, YAMAGUCHI Osamu, MAEDA Kenichi: "Face Recognizing System Using Video Image", the institute of electronics information and communication engineers Research Report PRMU, vol. 97, No. 113, pp. 17-24 (1997)) or a literature (MAEDA Kenichi, WATANABE Sataichi: "Pattern Matching Method Using Local Structure", the institute of electronics information and communication engineers Journal (D), vol. J68-D, No. 3, pp. 345-352 (1985)) may be used. When the mutual subspace method described in these literatures is used, the feature point detector 105 extracts m×n pixel image data from image data input sequentially by the image input unit 101, calculates a correlation matrix of a feature amount vector from the extracted image data, obtains an orthonormal vector by K-L development, and calculates a subspace representing face feature information acquired from consecutive image data.

In the subspace calculating method, the subspace may be calculated by obtaining a correlation matrix (or covariance matrix) of the feature amount vector and obtaining an orthonormal vector (eigenvector) by K-L development thereof. A k number of eigenvectors corresponding to eigenvalues are selected in descending order of eigenvalue, and the subspace is expressed by using a set of selected eigenvectors. In the present embodiment, a correlation matrix Cd is obtained from a feature vector and is diagonalized with a correlation matrix $Cd=\Phi d\Lambda d\Phi dT$, thereby obtaining a matrix $\Phi$ of an eigenvector. The matrix $\Phi$ of an eigenvector is the subspace representing a face feature of a person to be currently recognized. In the present embodiment, the subspace is used as face feature information of a person detected from input image data.

After a feature point is detected by the feature point detector 105, the feature extractor 106 perform direction correction (three-dimensional), size correction, and brightness correction with respect to the detected feature point. For example, if the detected face is facing toward left, the direction correction changes the direction toward which the face is facing to the front direction by fitting a three-dimensional model of a face of a person prepared to a face of the left direction. The size correction is a correction that performs reduction and enlargement in order to fit with a predetermined standard face size. After these corrections are performed, face feature information is extracted. Accordingly, the face feature information extracted by the feature extractor 106 can be unified regardless of the direction or size of a face detected. Accordingly, comparison with the face feature information of a person managed by the person information managing unit 107 can be easily performed.

The person information managing unit 107 manages face feature information preliminarily registered for each person. The person information managing unit 107 is a database that is used to perform person recognition by the recognizing unit 108 to be described later. With respect to each person to be searched for, the person information managing unit 107 according to the present embodiment manages the face feature information extracted by the feature extractor 106, attribute information such as the sex, age, height of the person, and the person ID or name of the person in a corresponding manner.

The face feature information extracted by the feature extractor 106 to be managed may be an m×n feature amount vector, a subspace, or a correlation matrix immediately before the performance of KL development. In addition, the face feature information extracted by the feature extractor 106 is managed together with the image data input by the image input unit 101, so that the search of a person or the display of search can be easily performed.

The recognizing unit 108 recognizes a person included in the image data input by the image input unit 101, based on the face feature information extracted by the feature extractor 106 and the face feature information stored in the person information managing unit 107. The recognizing unit 108 according to the present embodiment extracts the face feature information stored in the person information managing unit 107, which is similar to the face feature information extracted by the feature extractor 106, and recognizes a person represented by the extracted face feature information as a candidate photographed by the camera 150.

The recognizing unit 108 according to the present embodiment calculates a similarity between the face feature information extracted by the feature extractor 106 and the face feature information stored in the person information managing unit 107, and outputs information on a person represented by the face feature information to the display 109 in descending order of similarity of the face feature information.

As the processing result, in descending order of similarity from face identification information, the recognizing unit 108 outputs a person ID corresponding to the face identification information or information representing the calculated similarity to the person information managing unit 107. A variety of other information items on a person corresponding to the person ID may also be output.

Also, the recognizing unit 108 acquires the face feature point detecting technique used for detection by the feature point detector 105, corresponding to the face feature information extracted by the feature extractor 106, from the feature point detector 105 through the feature extractor 106. Then, the recognizing unit 108 outputs information identifying the acquired face feature point detecting technique, corresponding to the face feature information detected by the relevant technique, to the display 109.

In the present embodiment, information representing a similarity is a similarity between subspaces managed as face feature information. A similarity calculating method may use calculating techniques such as a subspace method and a multiple similarity method. In these calculating methods, the face feature information stored in the person information managing unit 107 and the face feature information extracted by the feature extractor 106 are represented as a subspace. Then, in the present embodiment, an angle between two subspaces is defined as a similarity degree. Then, the recognizing unit 108 obtains a correlation matrix Cin based on these two subspaces, diagonalizes the same with $Cin=\Phi in\Lambda in\Phi inT$, and obtains an eigenvector $\Phi in$. Thereafter, the recognizing unit 108 obtains a similarity (0.0 to 1.0) between two subspaces represented by $\Phi in$ and $\Phi inT$, and uses the same as a similarity for recognition. Also, for a specific calculation method, the technique described in the literature (Written by Erkki Oja and Translated by OGAWA Hidemitsu and SATO Makoto, "Pattern Recognition and Subspace Method", Industrial Book (Sangyotosho), 1986) may be used. Also, a plurality of face images corresponding to the same person may be pre-arranged and projected onto a subspace for identification of the subject person to improve identification accuracy. Also, a search method using a TREE structure may be used for high-speed search.

The display 109 displays information on a candidate recognized and output by the recognizing unit 108. Also, the display 109 is not limited to that displaying only a face recognition result, and may perform display in combination with the recognition result based on the attribute information managed by the person information managing unit 107.

Also, the display 109 may display only information on a person according with a designated condition, in real time, among the results recognized by the recognizing unit 108. Then, information on a person not according with the designated condition may be stored as history information in a history storage unit (not illustrated). Accordingly, by designating a search condition later, history information according with the search condition can be displayed. In addition, in the face recognizing apparatus, one or both of the real-time display and the search display may be included.

Also, when displaying information on a candidate, the display 109 according to the embodiment displays information representing the reliability of face authentication based on the face feature point detecting technique used by the feature point detector 105. The face recognizing apparatus 100 according to the present embodiment has plurality types of face feature point detecting techniques, but detection accuracy is different between the techniques. Thus, the display 109 according to the present embodiment displays information representing the reliability based on the face feature point detecting technique, together with information on the candidate.

Figure 5:
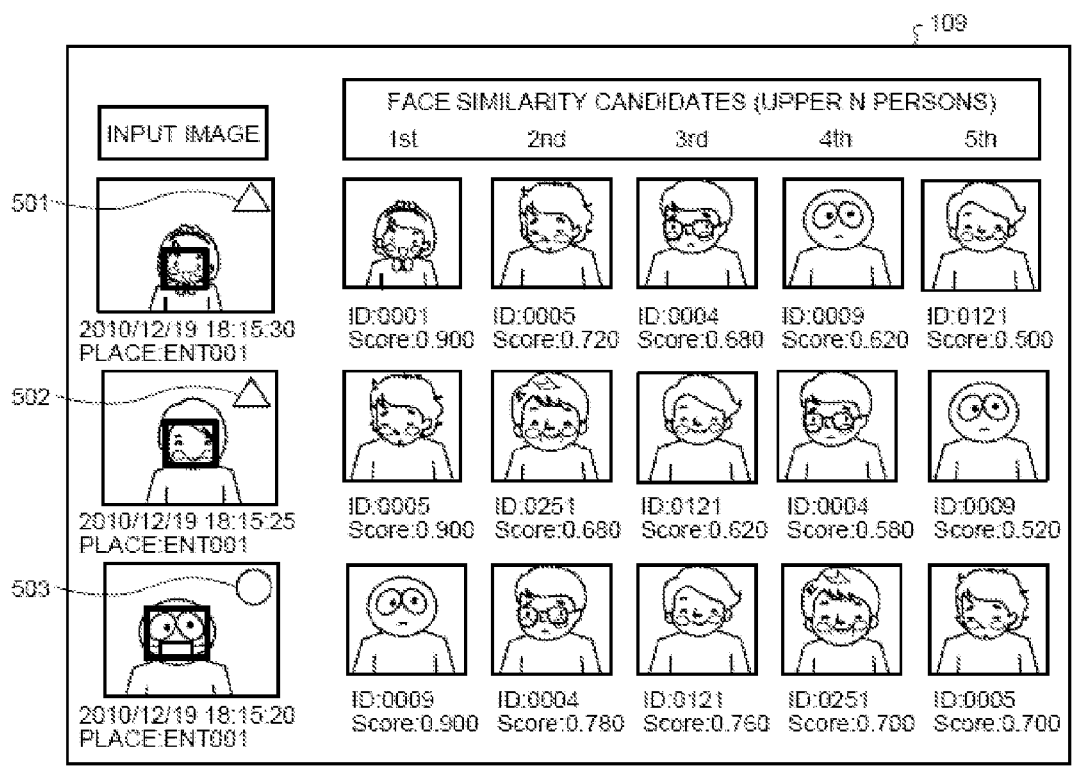
FIG. 5 is a diagram illustrating an example of a screen displayed by a display in the first embodiment.

FIG. 5 is a diagram illustrating an example of a screen displayed by the display 109. As illustrated in FIG. 5, the display 109 displays an image data group input by the image input unit 101 and information on a candidate determined to be high in similarity from the recognition based on a face region included in the relevant image data. As illustrated in the right-hand column of FIG. 5, the display 109 displays information on five candidates in descending order of similarity. Also, in the left-hand column, the display 109 displays image data included in a face of a person, among the image data captured by the camera 150.

Also, when displaying person authentication results, the display 109 displays symbols representing the reliability of detection based on the face feature point detecting techniques. In the present embodiment, when the face is viewed as large in size in the image data, since the third face feature point detecting technique can be used, the high accuracy of coordinates of feature points detected can be expected. Therefore, "O" (503) indicating a high detection accuracy is displayed. Also, when the face is viewed as medium in size in the image data, since the second face feature point detecting technique can be used, "Δ" (502, 501) representing a medium detection accuracy is displayed. Also, when the face is viewed as small in size in the image data, since the first face feature point detecting technique is used, "-" representing that the detection accuracy of coordinates of feature points detected is lower than those of the other two techniques is displayed. In the examples of a screen illustrated in FIG. 5 and FIG. 6 to be described below, only the face region of the face of each person is displayed, and feature point coordinates are not displayed. This is to easily detect a face part, and a face feature point may be displayed when needed.

As described above, in the present embodiment, when the display 109 performs display, a character or a symbol representing the detection reliability corresponding to the face feature point detecting technique is displayed, thereby the user can easily determine whether the position accuracy of a face feature point detected is high. Also, since the position accuracy of a face feature point is improved, the search accuracy of a candidate is improved. Therefore, it is easy to determine whether the reliability of a displayed candidate list is high.

Also, a criterion based on the face feature point detecting technique may be predetermined, and control may be performed such that the display 109 displays a candidate list only when the criterion is satisfied. For example, the display 109 may not display a candidate list based on a face feature point detecting technique using the first face feature point detecting technique having lower reliability than the other two techniques, and may display a candidate list based on the other two techniques. Accordingly, since a candidate list having high reliability is displayed, the reliability can be improved.

Also, the present embodiment is not limited to the display mode illustrated in FIG. 5. For example, upon displaying the face detection result on the screen, the face recognizing apparatus 100 may display the image data captured by the camera 150, while superimposing the face region and the reliability of detection.

Figure 6:
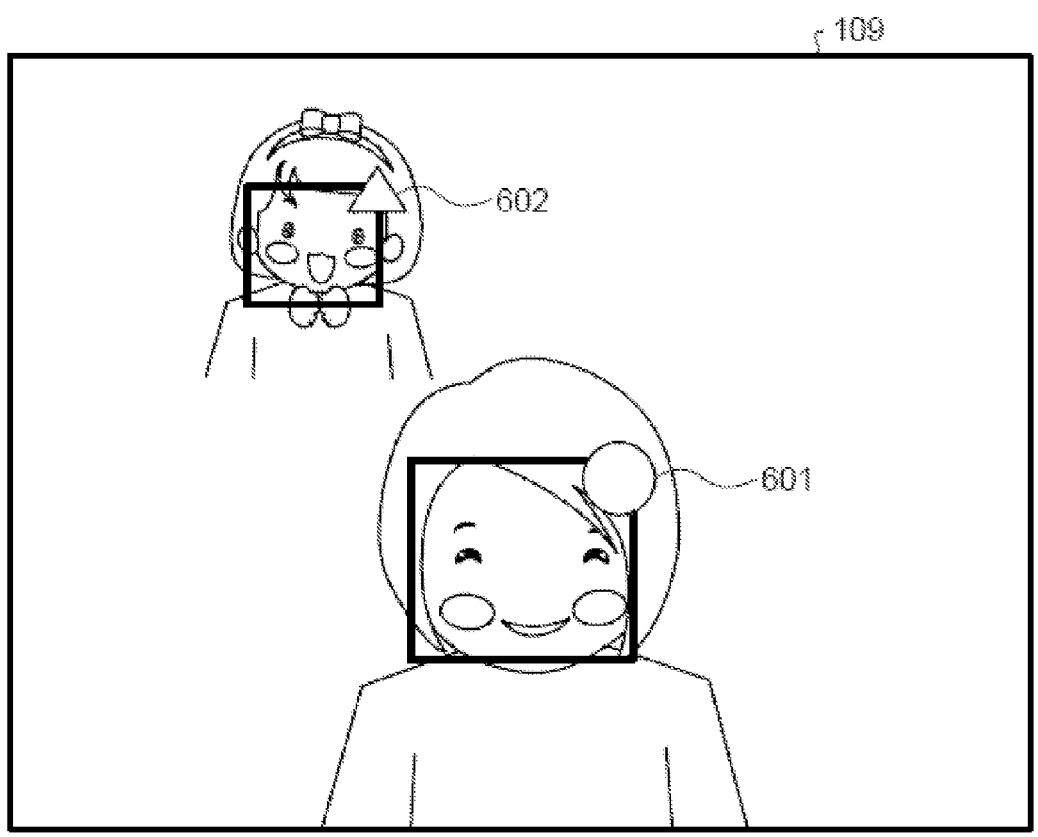
FIG. 6 is a diagram illustrating an example of a screen displayed by a display according to a modification of the first embodiment.

FIG. 6 is a diagram illustrating an example of a screen displayed by the display 109 according to a modification. As illustrated in FIG. 6, among the input image data, with respect to the detected face region, the display 109 displays the reliability of detection based on the face feature point detecting technique used (for example, "O" (601) and "Δ" (602)). Accordingly, the user can recognize whether the reliability in the detection accuracy of a face feature point detected in each face region is high. Accordingly, the user can recognize whether the reliability of a candidate list for each face region stored as a detection history is high.

Figure 7:
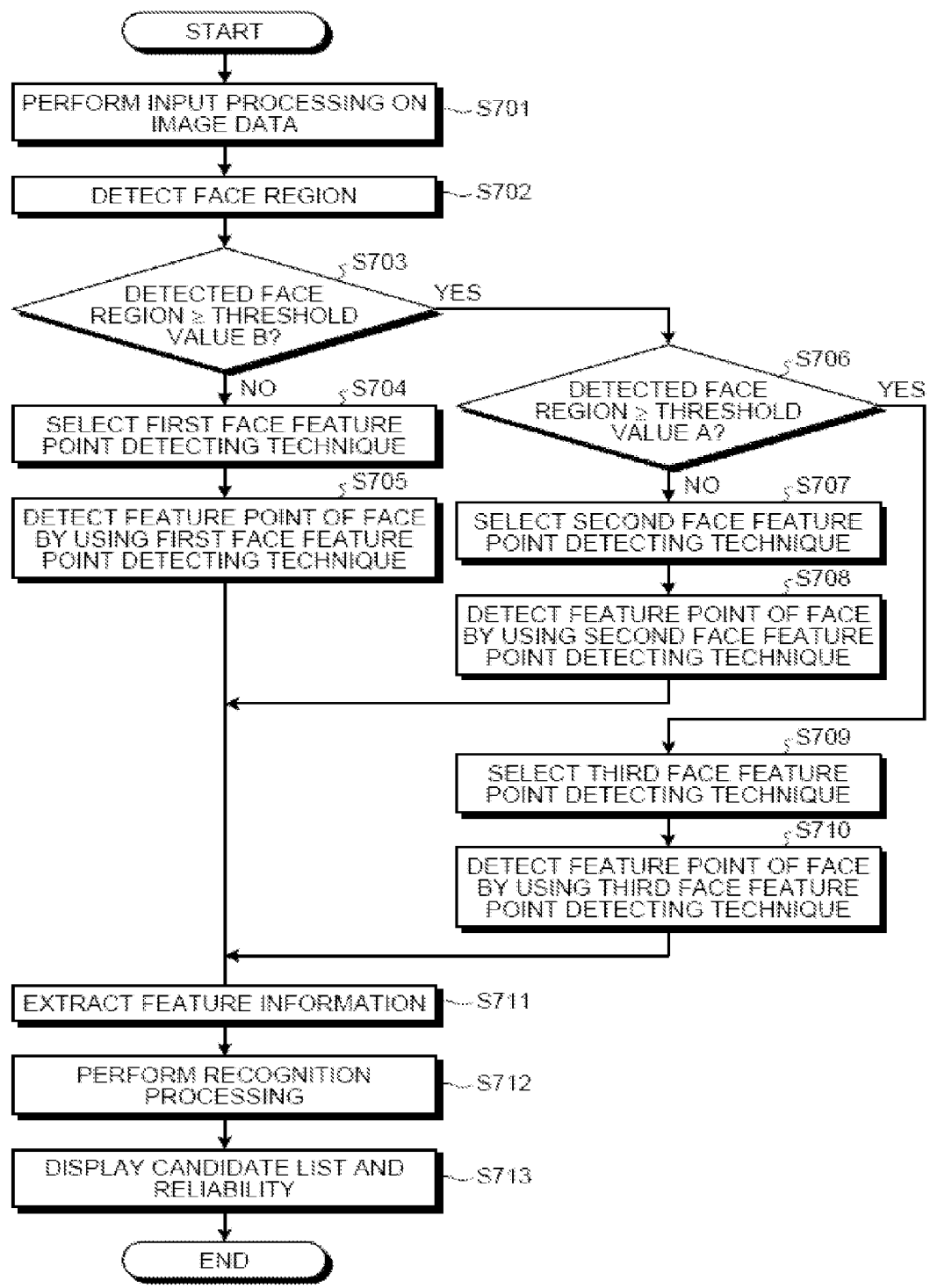
FIG. 7 is an exemplary flowchart illustrating a sequence of recognizing process of a face of a person in a face recognizing apparatus in the first embodiment.

Hereinafter, a process of recognizing a face of a person in the face recognizing apparatus 100 according to the present embodiment will be described. FIG. 7 is a flowchart illustrating the above process in the face recognizing apparatus 100 according to the present embodiment.

The image input unit 101 inputs image data from the camera 150 (S701). Thereafter, the face region detector 102 detects a face region from the input image data (S702).

Thereafter, the technique selector 104 determines whether a size of the detected face region is equal to or greater than a predetermined threshold value B (S703). If it is determined that the size of the detected face region is smaller than the predetermined threshold value B (No in S703), the technique selector 104 selects the first face feature point detecting technique (S704). Then, the feature point detector 105 detects a face feature point from the detected face region by using the selected first face feature point detecting technique (S705).

On the other hand, if it is determined that the size of the detected face region is equal to or greater than the predetermined threshold value B (Yes in S703), the technique selector 104 determines whether the size of the detected face region is equal to or greater than a predetermined threshold value A (S706). Herein, the threshold value A>the threshold value B. If it is determined that the size of the detected face region is smaller than the predetermined threshold value A (No in S706), the technique selector 104 selects the second face feature point detecting technique (S707). Then, the feature point detector 105 detects a face feature point from the detected face region by using the selected second face feature point detecting technique (S708).

On the other hand, if the technique selector 104 determines that the size of the detected face region is equal to or greater than the predetermined threshold value A (Yes in S706), the technique selector 104 selects the third face feature point detecting technique (S709). Then, the feature point detector 105 detects a face feature point from the detected face region by using the selected third face feature point detecting technique (S710).

Then, the feature extractor 106 extracts face feature information based on the detected face feature point (S711). In this case, the feature extractor 106 performs direction correction (three-dimensional), size correction, and brightness correction with respect to the detected feature point. Accordingly, a different size, brightness, and face direction are corrected with respect to each face region of the image data.

Thereafter, the recognizing unit 108 performs recognition based on the face feature information extracted by the feature extractor 106 and the face feature information stored in the person information managing unit 107, and extracts a candidate for a person viewed in the image data (S712).

Then, the display 109 displays a list of candidates extracted and the reliability based on the face feature point detecting technique (S713).

The first embodiment describes the example of selecting one of three types of face feature point detecting techniques according to the size of the detected face region. However, the present embodiment is not limited to the selection according to the size, and a technique of switching to another face feature point detecting technique according to the result of feature point detection using any face feature point detecting technique may be used in a combined manner.

As described above, the face feature point detecting technique with high detection accuracy is weak against low resolution. Thus, in a modification, the face feature point detecting technique with high detection accuracy (for example, the third face feature point detecting technique) is first used to detect a face feature point, and it is determined whether a position of the detected face feature point is appropriate. If the position is not appropriate, it is determined that the size (resolution) of a face region to be detected is not appropriate. Then, the face feature point detecting technique robust against low resolution (for example, the second face feature point detecting technique) is used to detect a face feature point.

Figure 8:
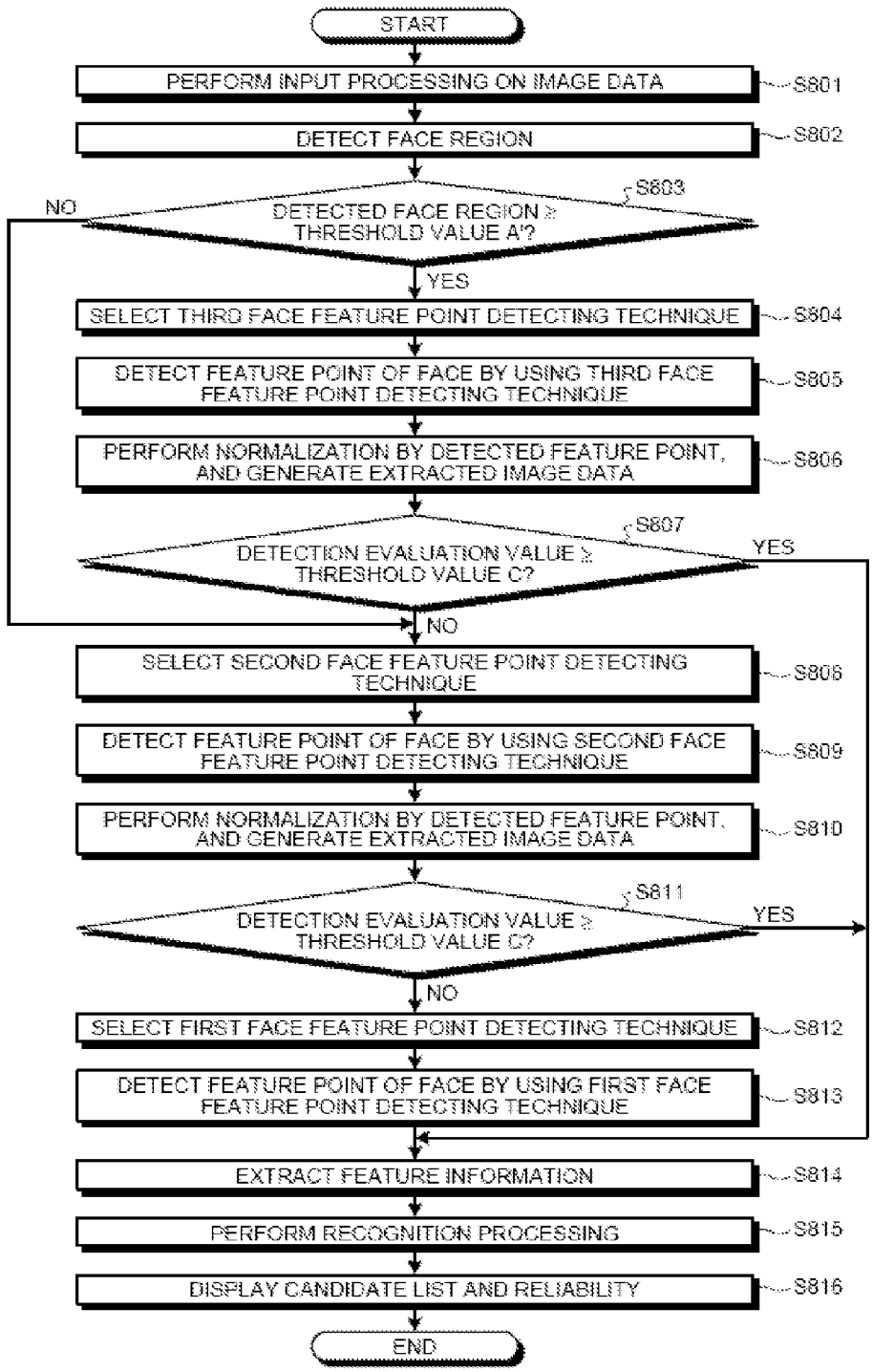
FIG. 8 is an exemplary flowchart illustrating a sequence of recognizing process of a face of a person in a face recognizing apparatus according to the modification of the first embodiment.

Hereinafter, a process of recognizing a face of a person in the face recognizing apparatus 100 according to the modification will be described. FIG. 8 is a flowchart illustrating the above process in the face recognizing apparatus 100 according to a modification of the first embodiment.

The image input unit 101 receives image data from the camera 150 (S801). Thereafter, the face region detector 102 detects a face region from the input image data (S802).

Thereafter, the technique selector 104 determines whether a size of the detected face region is equal to or greater than a predetermined threshold value A' (S803). If it is determined that the size of the detected face region is equal to or greater than the predetermined threshold value A' (Yes in S803), the technique selector 104 selects the third face feature point detecting technique (S804). Then, the feature point detector 105 detects a face feature point from the detected face region by using the selected third face feature point detecting technique (S805).

Thereafter, the feature extractor 106 performs normalization to the feature point detected in S805, and generates extracted image data based on the face region (S806). Then, the feature extractor 106 evaluates the position of a face feature point with respect to the generated extracted image data. Then, the feature extractor 106 determines whether a detection evaluation value is equal to or greater than a reference value C based on an average face pattern of a person (S807). In addition, the threshold value C is set according to an embodiment. Then, if the detection evaluation value is equal to or greater than the threshold value C (Yes in S807), the process proceeds to S814.

On the other hand, if the feature extractor 106 determines in S807 that the detection result value is smaller than the reference value C (No in S807), or if the technique selector 104 determines in S803 that the size of the detected face region is smaller than the predetermined threshold value A' (No in S803), the technique selector 104 selects the second face feature point detecting technique (S808). Then, the feature point detector 105 detects a face feature point from the detected face region by using the selected second face feature point detecting technique (S809).

Thereafter, the feature extractor 106 performs normalization to the feature point detected in S809, and generates extracted image data based on the face region (S810). Then, the feature extractor 106 evaluates the position of a face feature point with respect to the generated extracted image data. Then, the feature extractor 106 determines whether a detection evaluation value is equal to or greater than a reference value C based on an average face pattern of a person (S811). Then, if the detection evaluation value is equal to or greater than the reference value C (Yes in S811), the process proceeds to S814.

On the other hand, if the feature extractor 106 determines in S811 that the detection result value is smaller than the reference value C (No in S811), the technique selector 104 selects the first face feature point detecting technique (S812). Then, the feature point detector 105 detects a face feature point from the detected face region by using the selected first face feature point detecting technique (S813).

Then, the feature extractor 106 extracts face feature information based on the detected face feature point (S814). In this case, the feature extractor 106 performs direction correction (three-dimensional), size correction, and brightness correction with respect to the detected feature point. Accordingly, a different size, brightness, and face direction are corrected with respect to each face region of the image data.

Thereafter, the recognizing unit 108 extracts a candidate for a person viewed in the image data by performing recognition based on the face feature information extracted by the feature extractor 106 and the face feature information stored in the person information managing unit 107 (S815).

Then, the display 109 displays a list of candidates extracted and the reliability based on the face feature point detecting technique (S816).

According to the above process, a face feature point can be detected by using a face feature point detecting technique suitable for a detected face region. Accordingly, the accuracy of person recognition can be improved.

In the first embodiment, the example of detecting a face feature point by using the selected face feature point detecting technique has been described. However, instead of using one selected face feature point detecting technique, a combination of a plurality of face feature point detecting techniques may be used. Thus, in a second embodiment, an example of using a combination of a plurality of face feature point detecting techniques will be described.

Figure 9:
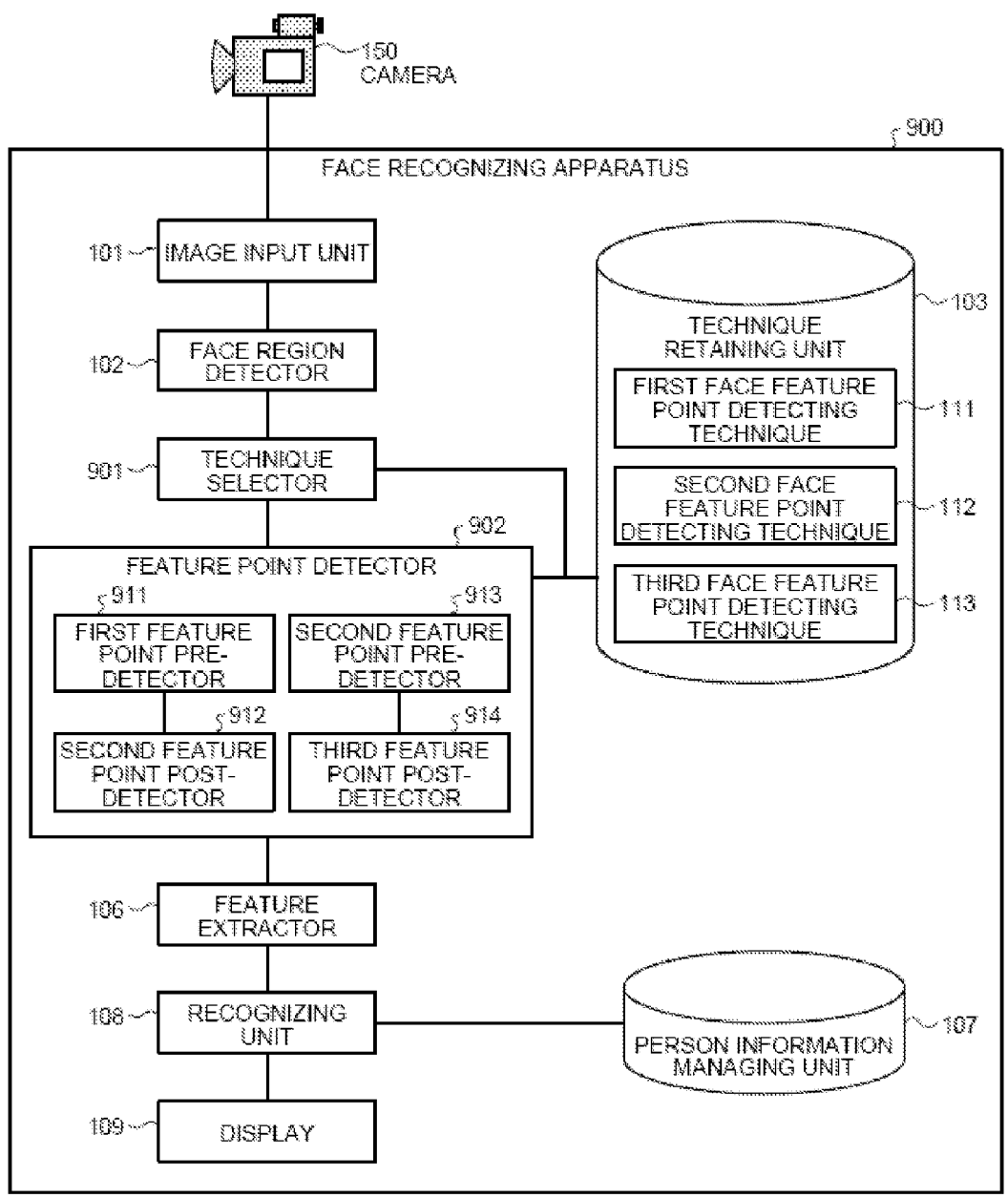
FIG. 9 is an exemplary block diagram illustrating a configuration of a face recognizing apparatus according to a second embodiment.

FIG. 9 is a block diagram illustrating a configuration of a face recognizing apparatus 900 according to a second embodiment. The face recognizing apparatus 900 according to the present embodiment is different from the face recognizing apparatus 100 according to the above-described first embodiment in that a technique selector 901 performs a process different from that of the technique selector 104 and a feature point detector 902 performs a process different from that of the feature point detector 105. In the following description, the same elements as those in the first embodiment will be denoted by the same reference numerals, and a redundant description thereof will not be provided.

The technique selector 901 selects a combination of the first face feature point detecting technique and the second face feature point detecting technique or a combination of the second face feature point detecting technique and the third face feature point detecting technique, based on the image size of a face region detected by the face region detector 102, for detection of a face feature point. In the present embodiment, the number of pixels representing a horizontal width and a vertical width is calculated from the coordinates of vertexes of a rectangular shape representing a face region, and a face feature detecting technique is selected based on whether the calculated number of pixels is equal to or greater than a predetermined threshold value A".

By using a combination of face feature point detecting techniques selected by the technique selector 901, the feature point detector 902 detects a position of a face part such as an eye, a nose, or the like, as a feature point of a face, from a face region detected by the face region detector 102.

In order to detect a face part from a detected face region as a face feature point, the feature point detector 902 uses a combination of a plurality of different face feature point detecting techniques according to the size difference of a face region.

Also, the feature point detector 902 performs face feature point detection by using a face feature point detecting technique that can easily detect a face feature point even at low resolution, and then corrects the position of a face feature point by using a face feature point detecting technique that has higher detection position accuracy with an upper limit of a predetermined region around each feature point. This makes it possible to suppress the degradation of recognition accuracy in identifying a person and perform face recognition with high accuracy even when a low-resolution face image is input.

The feature point detector 902 includes a first feature point pre-detector 911, a second feature point post-detector 912, a second feature point pre-detector 913, and a third feature point post-detector 914.

The first feature point pre-detector 911 uses the first face feature point detecting technique as pre-processing to detect a face feature point from the face region detected by the face region detector 102.

The second feature point post-detector 912 uses the second face feature point detecting technique as post-processing to detect a face feature point in a predetermined region around the face feature point detected by the first feature point pre-detector 911.

The second feature point pre-detector 913 uses the second face feature point detecting technique as pre-processing to detect a face feature point from the face region detected by the face region detector 102.

The third feature point post-detector 914 uses the third face feature point detecting technique as post-processing to detect a face feature point in a predetermined region around the face feature point detected by the first feature point pre-detector 911.

For example, the third face feature point detecting technique detects a face feature point based on luminance distribution information or shape information of a face region, but requires a heavy processing load for performing detailed detection processing. Therefore, in the feature point detector 902, the second feature point pre-detector 913 uses the second feature point detecting technique to detect a face feature point, and the third feature point post-detector 914 uses the third face feature point detecting technique to perform face feature point detection only in a predetermined region around the detected face feature point. Accordingly, a processing load can be reduced, and the position identification accuracy of a face feature point can be increased. In addition, a predetermined region around the feature point shall be preliminarily determined according to each embodiment.

Likewise, the first feature point pre-detector 911 uses the first feature point detecting technique to detect a feature point, a face direction, or the like, and the second feature point post-detector 912 fits a default position of a face feature point based on the detected face direction and uses the second face feature point detecting technique to perform face feature point detection only in a predetermined region around the default position. Accordingly, a processing load can be reduced, and the position identification accuracy of a face feature point can be increased.

In addition, although the present embodiment describes an example of combining two types of face feature point detecting techniques as an example of a combination of a plurality of face feature point detecting techniques, three or more types of face feature point detecting techniques may be combined to perform feature point detection.

In addition, the feature point detector 902 of the face recognizing apparatus 900 according to the present embodiment may use a face feature point pre-detecting technique to perform face feature point detection, and then verify whether position correction by face feature point post-detection is necessary. Then, as a result of the verification, if it is determined that position correction by face feature point post-detection is necessary, the feature point detector 902 uses a face feature point post-detecting technique to perform correction. In the present embodiment, the feature point detector 902 generates a normalized extracted image of a face region comprised of M×N pixels based on the face feature point detection results by the face feature point pre-detecting/post-detecting techniques, calculates a similarity between a pattern of the normalized extracted image and a preliminarily learned pattern as an average face pattern of a person, and performs face feature point position correction by the face feature point post-detecting technique if the calculated similarity is smaller than a predetermined similarity.

Figure 10:
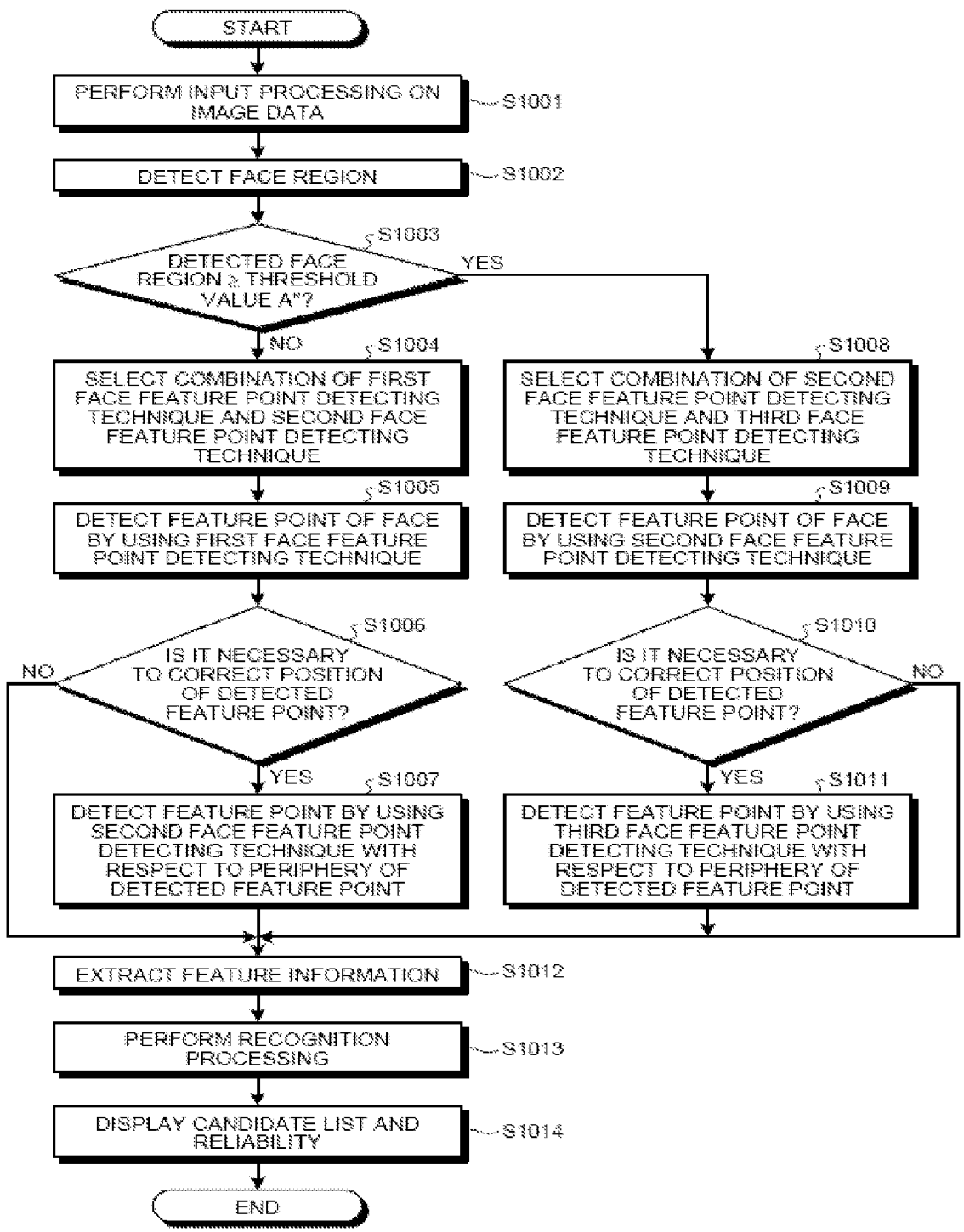
FIG. 10 is an exemplary flowchart illustrating a sequence of recognizing process of a face of a person in a face recognizing apparatus in the second embodiment.

Hereinafter, a process of recognizing a face of a person in the face recognizing apparatus 900 according to the present embodiment will be described. FIG. 10 is a flowchart illustrating the above process in the face recognizing apparatus 900 according to the present embodiment.

The image input unit 101 inputs image data from the camera 150 (S1001). Thereafter, the face region detector 102 detects a face region from the input image data (S1002).

Thereafter, the technique selector 901 determines whether a size of the detected face region is equal to or greater than a predetermined threshold value A" (S1003). If it is determined that the size of the detected face region is smaller than the predetermined threshold value A" (No in S1003), the technique selector 901 selects a combination of the first face feature point detecting technique and the second face feature point detecting technique (S1004). Then, the first feature point pre-detector 911 detects a face feature point from the detected face region by using the selected first face feature point detecting technique (S1005).

Thereafter, the feature point detector 902 determines if it is necessary to correct position of the detected face feature point (S1006). Any technique may be used to determine if it is necessary to correct the position of the detected face feature point. In the present embodiment, whether the position correction is necessary is determined based on a similarity calculated with respect to a preliminarily learned pattern as described above. If it is determined that the position correction is not necessary (No in S1006), the process proceeds to S1012.

On the other hand, if the feature point detector 902 determines that the position correction is necessary (Yes in S1006), the second feature point post-detector 912 uses the second face feature point detecting technique to perform face feature point detection, that is, position correction with respect to a predetermined region around the feature point detected in S1005 (S1007).

On the other hand, if the technique selector 901 determines in S1003 that the size of the detected face region is equal to or greater than the predetermined threshold value A" (Yes in S1003), the technique selector 901 selects a combination of the second face feature point detecting technique and the third face feature point detecting technique (S1008). Then, the second feature point pre-detector 913 detects a face feature point from the detected face region by using the selected second face feature point detecting technique (S1009).

Thereafter, the feature point detector 902 determines if it is necessary to correct position of the detected face feature point (S1010). If it is determined that the position correction is not necessary (No in S1010), the process proceeds to S1012.

On the other hand, if the feature point detector 902 determines that the position correction is necessary (Yes in S1010), the third feature point post-detector 914 uses the third face feature point detecting technique to perform face feature point detection, that is, position correction with respect to a predetermined region around the feature point detected in S1009 (S1011).

Then, the feature extractor 106 extracts face feature information based on the detected face feature point (S1012). In this case, the feature extractor 106 performs direction correction (three-dimensional), size correction, and brightness correction with respect to the detected feature point. Accordingly, a different size, brightness, and face direction are corrected with respect to each face region of the image data.

Thereafter, the recognizing unit 108 performs recognition based on the face feature information extracted by the feature extractor 106 and the face feature information stored in the person information managing unit 107, and extracts a candidate for a person viewed in the image data (S1013).

Then, the display 109 displays a list of candidates extracted and the reliability based on the face feature point detecting technique (S1014).

By the above process, different face feature point detecting techniques can be applied according to the sizes of face regions, and a plurality of face feature point detecting techniques can be combined to perform face feature point detection. Accordingly, the position detection accuracy of a face feature point can be increased. Also, a processing load can be reduced because the face feature point detecting technique that provides high accuracy but requires a heavy processing load is applied only to a predetermined region.

Also, upon displaying information on a candidate, the display 109 according to the present embodiment displays information representing the reliability of face authentication based on the face feature point detecting technique used by the feature point detector 902. For example, when the post-detection processing is performed, the display 109 displays information representing the reliability based on the face feature point post-detecting technique. If only the pre-detection processing is performed, the display 109 may display the reliability based on the face feature point pre-detecting technique, and if it is determined that the position correction is not necessary, the display 109 may display the reliability equal to that based on the feature point post-detecting technique.

Also, although the present embodiment describes an example of switching a combination of face feature point detecting techniques according to the size (resolution) of a face region, the switching according to the size of a face region is not necessarily to be performed. For example, the face feature point detection processing may be performed by using the face feature point detecting techniques sequentially from the face feature point detecting technique corresponding to the low resolution, regardless of the size of a face region.

In this manner, the face recognizing apparatus 900 according to the second embodiment can suppress the occurrence of an extreme error in the face feature point detection position even in the case of a low-resolution image, and can increase the position accuracy to the maximum.

In addition, the technique of combining the face feature point detecting techniques is not limited to applying the face feature point post-detecting technique only to a predetermined region based on the position of a face feature point detected by the face feature point pre-detecting technique, as illustrated in the second embodiment.

For example, the face feature point detection may be performed on a region wider than the predetermined region (for example, an entire face region) by the face feature point post-detecting technique. In this case, the detection coordinates acquired by the face feature point post-detecting technique may be compared with the detection coordinates acquired by the face feature point pre-detecting technique. Then, if the post-detection coordinates deviate by less than a predetermined region from the pre-detection coordinates, the post-detection result may be used; and if the post-detection coordinates deviate by more than the predetermined region from the pre-detection coordinates, the face feature point pre-detecting technique may be maintained.

By the first and second embodiments described above, an appropriate face feature point detecting technique is selected according to the size of a face region in image data, so that the degradation of face recognition accuracy can be suppressed.

Figure 11:
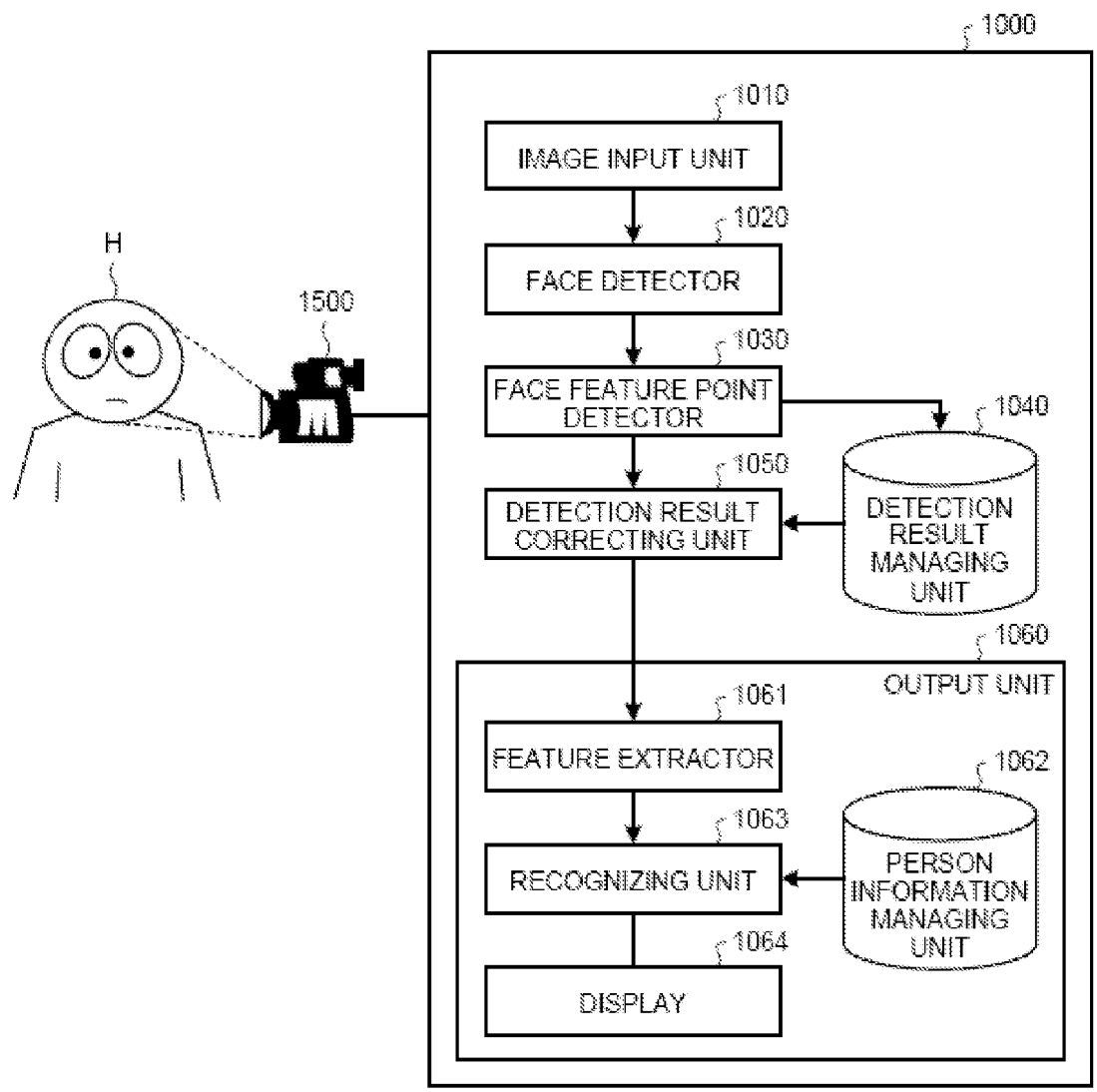
FIG. 11 is a block diagram illustrating an example of a configuration of a face recognizing apparatus according to a third embodiment.

FIG. 11 is a block diagram illustrating an example of a configuration of a face recognizing apparatus 1000 according to a third embodiment. As illustrated in FIG. 11, the face recognizing apparatus 1000 includes an image input unit 1010, a face detector 1020, a face feature point detector 1030, a detection result managing unit 1040, a detection result correcting unit 1050, and an output unit 1060. Also, the face recognizing apparatus 1000 performs authentication of a person H based on a video image captured from a camera 1500.

The camera 1500 performs photographing on a predetermined region. For example, the camera 1500 is a monitoring camera performing photographing on an entrance and exit area of a passage road, or the like, and generates video data corresponding to the photographing result. Then, the image input unit 1010 inputs the video data from the camera 1500.

The camera 1500 may be installed in at least one place, or at a plurality of points. Also, the camera 1500 is used to input a face image of a person present in a predetermined region, and is, for example, an ITV (industrial television). The camera 1500 generates frame image data of a predetermined frame rate by digitizing optical information captured through a camera lens by an A/D converter, and outputs the frame image data to the face recognizing apparatus 1000.

Figure 12:
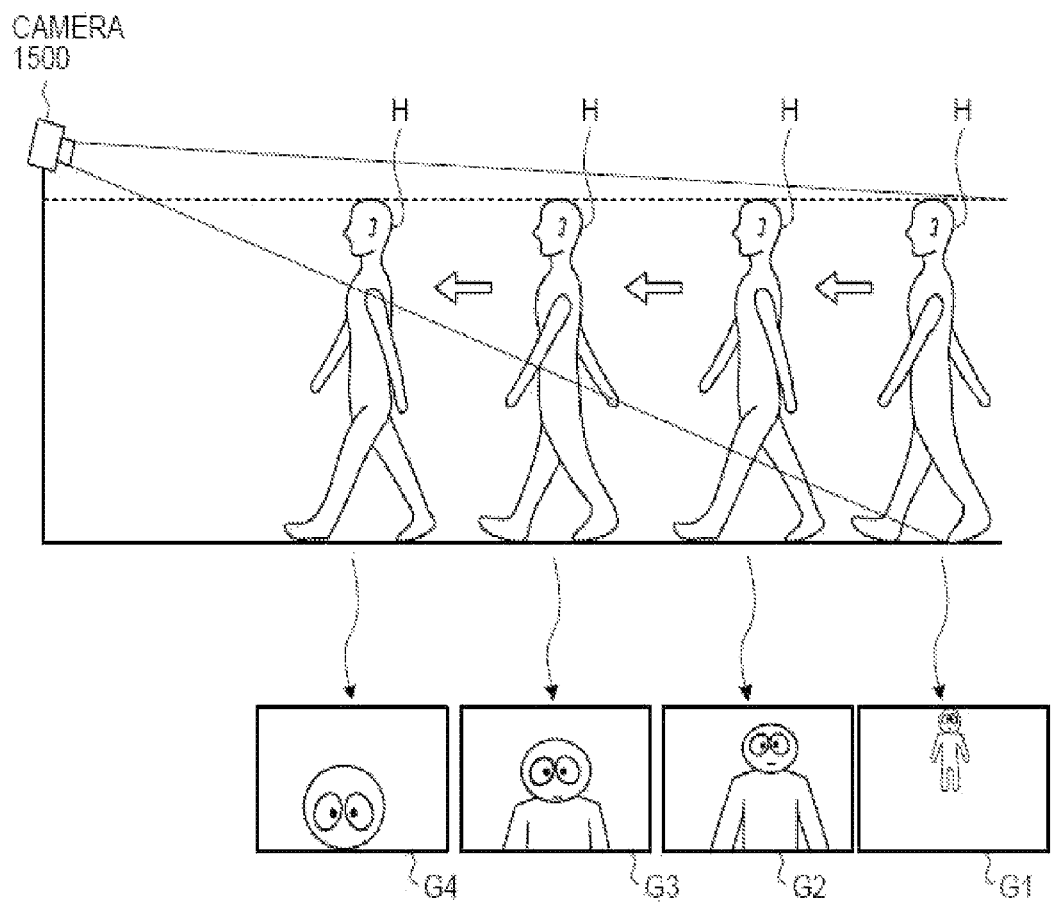
FIG. 12 is a conceptual diagram illustrating an example of video data input from a camera, in the third embodiment.

FIG. 12 is a conceptual diagram illustrating an example of video data input from the camera 1500. As illustrated in FIG. 12, when the person H walks toward the camera 1500, a series of frame images G1 to G4 are captured by the camera 1500. The frame images G1 to G4 captured by the camera 1500 are input to the image input unit 1010 in the face recognizing apparatus 1000. In addition, in the present embodiment, an input of video data captured by the camera 1500 is illustrated as an example. However, it is needless to say that the video data input to the image input unit 1010 may be video data recorded in a DVR (digital video recorder) or the like.

Figure 13:
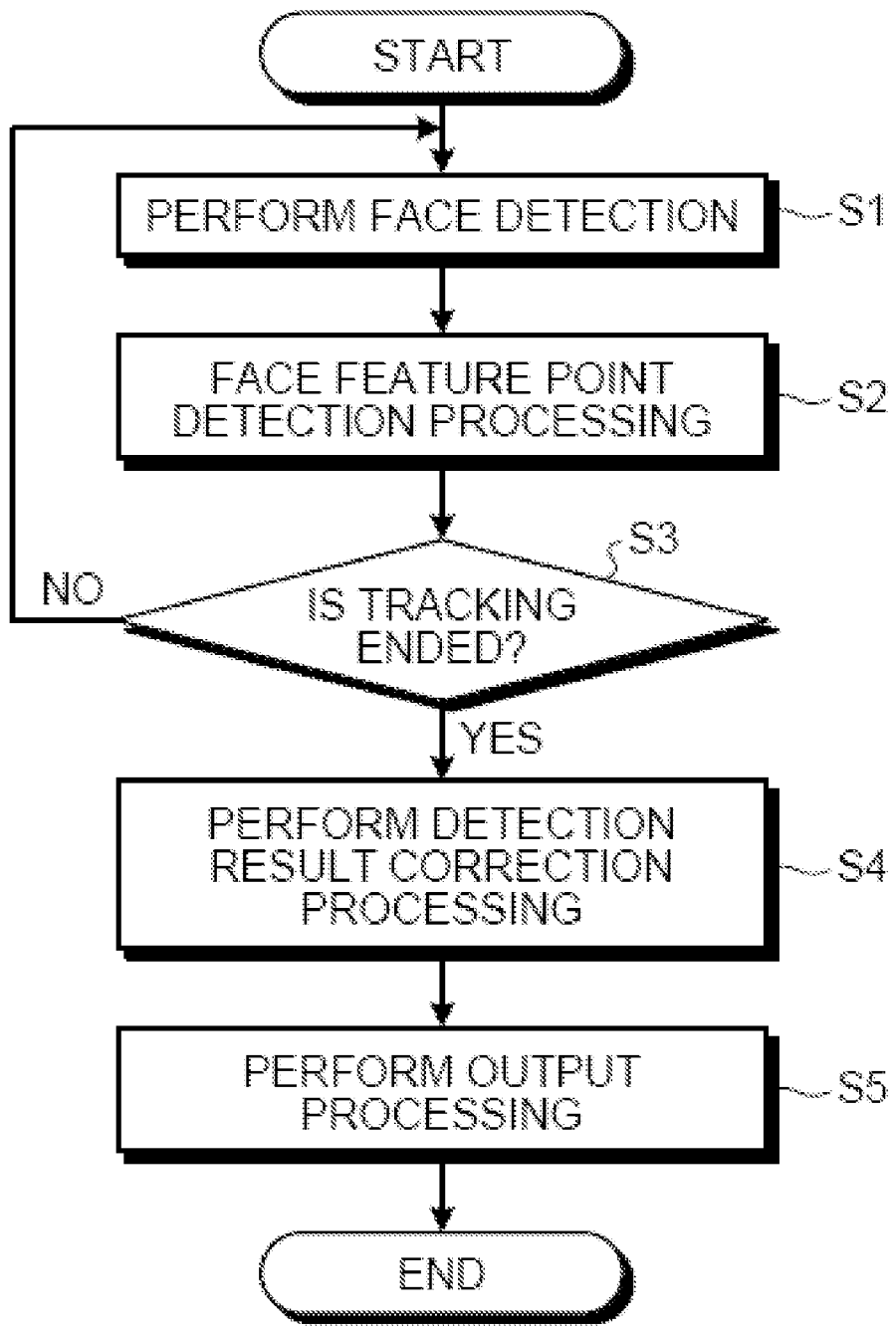
FIG. 13 is a flowchart illustrating an example of an operation of a face recognizing apparatus, in the third embodiment.

FIG. 13 is a flowchart illustrating an example of an operation of the face recognizing apparatus 1000 according to a third embodiment. Hereinafter, with reference to the flowchart illustrated in FIG. 13, the operation will be described in detail in the order of the face detector 1020, the face feature point detector 1030, the detection result managing unit 1040, the detection result correcting unit 1050, and the output unit 1060 illustrated in FIG. 11.

The face detector 1020 detects a face region representing a face of the same person over a plurality of frame images, from video data input by the image input unit 1010 (S1 of FIG. 13). Specifically, the face detector 1020 detects a face region in the following manner. First, the face detector 1020 obtains coordinates representing a face region by using luminance information on the video data in the input video data (each frame image). Any technique may be used as a technique of detecting the face region. The present embodiment performs face region detection by using, for example, the technique described in the literature (MITA, Takeshi, et al.: "Joint Haar-like Features Based on Concurrence Suitable for Face Detection", the institute of electronics information and communication engineers Journal (D), vol. J89-D, 8, pp. 1791-1801 (2006)). As an example of another detection technique, there may be a technique of obtaining correlation values while shifting a prepared template within input image data, and detecting a position providing the highest correlation value as a face region, or a technique of using a face extracting method using an eigenspace method, a subspace method, or the like.

Figure 14:
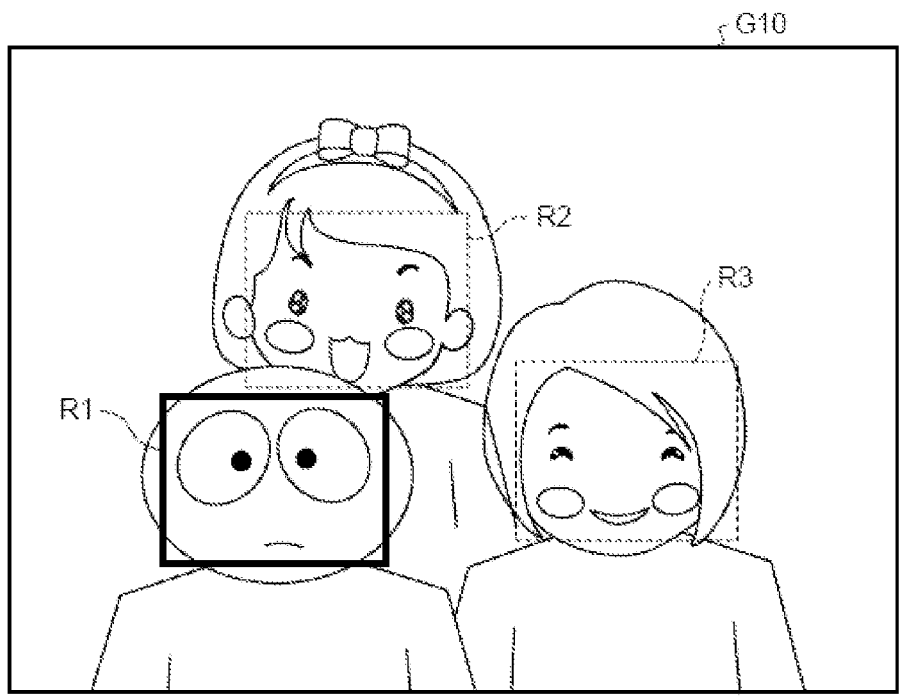
FIG. 14 is a conceptual diagram illustrating an example of detecting a face region from a frame image, in the third embodiment.

Also, the shape of a face region detected may be any shape, and the shape of a face region may vary according to a detection result of the direction or size of a face. For the purpose of easy description, the present embodiment detects a rectangular face region. FIG. 14 is a conceptual diagram illustrating an example of detecting a face region from a frame image G10. As illustrated in FIG. 14, coordinates representing vertexes of rectangular face regions R1 to R3 in the frame image G10 are taken as the detection results of a face region.

By the way, in the case of image data captured by a monitoring camera or the like, it is likely that a detected face of the same person will be viewed continuously over a plurality of frames. For this reason, it is necessary to track a face of a person so that these can correspond to the same person. This tracking may be implemented by using, for example, a technique of estimating which position in a next frame a face detected by using an optical flow is present at, and matching the same thereto. This tracking is continued until the determination of a tracking end is performed (Yes in S3 of FIG. 13) since a face region corresponding to the same person is not detected by the face detector 1020. Then, in order to recognize a person, a feature extractor 1061 to be described below may select at least one appropriate image among a face region of a plurality of frames corresponding to the same person, and extract face feature information from a selected face region. Also, the feature extractor 1061 may extract face feature information whenever a size of a face region is increased, so that any number of image data may be used for detection until a face region of the maximum size is detected.

Figure 15:
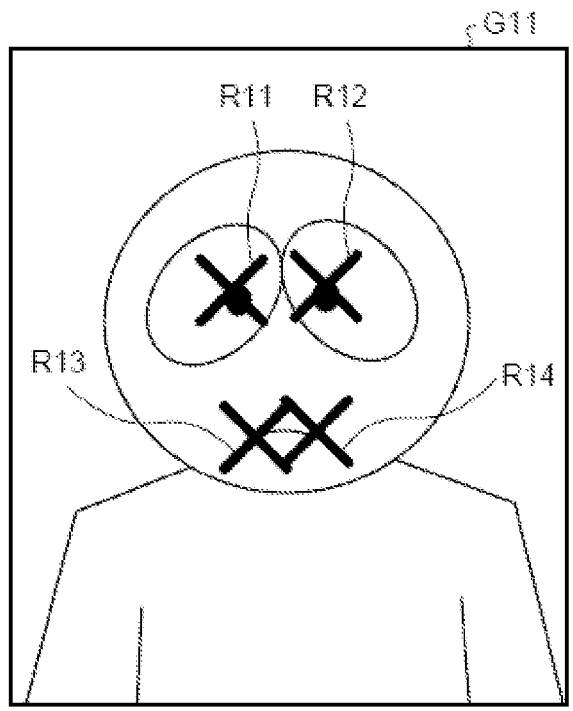
FIG. 15 is a conceptual diagram illustrating an example of detecting a face feature point from the detected face region image, in the third embodiment.

The face feature point detector 1030 performs a face feature point detecting process of detecting a feature point of a face, such as an eye, a nose, or the like, for each frame image from a face region detected over a plurality of frame images by the face detector 1020 through the tracking process (S2 of FIG. 13). FIG. 15 is a conceptual diagram illustrating an example of detecting face feature points R11 to R14 from a face image G11 of a detected face region. As illustrated in FIG. 15, feature points R11 to R14 corresponding to pupils of both eyes and both corners of a mouth are detected from the face image G11 of the face region detected by the face detector 1020. In addition, face feature points to be detected may vary randomly according to settings.

A method of detecting a face feature point by the face feature point detector 1030 may be implemented by, for example, a method described in a literature (FUKUI Kazuhiro, YAMAGUCHI Osamu: "Face Feature Point Extraction by Combination of Shape Extraction and Pattern Check", the institute of electronics information and communication engineers Journal (D), vol. J80-D-II, No. 8, pp. 2170-2177 (1997)). In the present embodiment, an example of using a feature of a face region is described. However, even in the case of an apparatus of determining whether a target is a face based on an image of an iris/retina/eye, the detection may be performed, for example, by zooming a camera based on an eye region detected by the above process. Also, in addition to detection of the eye/nose, detection of a mouth region can be easily implemented by using the technique described in the literature (YUASA Mayumi, NAKAJIMA Akiko: "Digital Make System Based on High-accuracy Face Feature Point Detection", Proceedings of the 10th Symposium on Image Sensing, pp. 219-224 (2004)). In either case, information capable of being treated as a two-dimensional array image may be acquired, and a face feature region may be detected from the information.

Also, in order to extract only one face feature from one image, the detecting process may obtain a correlation value of an overall image with respect to a template and output the maximum position and size. In order to extract a plurality of face features, the detecting process may obtain a local maximum value of a correlation value of an overall image, narrow a face candidate position in consideration of an overlap in one image, and finally find a plurality of face features simultaneously in consideration of the relationship with the previous continuously-inputted images.

Also, in order to perform detection even in the case of wearing a mask, sunglasses or a hat, a template may be previously learned with a face pattern in the case where a portion of a face is covered with sunglasses, a mask, or a hat. Even if all feature points of a face may not be detected, if some feature points of the face are detected with sufficient evaluation values, the other feature points may be predicted from a feature point detected by using a two-dimensional or three-dimensional face model. If a feature point is covered with a mask, a hat, or sunglasses such that the feature point may not be detected at all, the detection may be implemented by previously learning the whole pattern of a face, detecting the position of an entire face, and predicting a feature point from the position of an entire face. Also, even if a plurality of faces are present in an image, the detection may be implemented by performing the same process on each face.

The detection result managing unit 1040 is a database that stores information on the position of a face and the position of a face feature point obtained by the face detector 1020 and the face feature point detector 1030, information matching the walks of the same person between frames obtained by a tracking process, face image information, background image information, and other information such as time and place. The detection result correcting unit 1050 corrects position information of a face feature point with reference to the database of the detection result managing unit 1040. The detection result managing unit 1040 may store data after application of the detection result correcting unit 1050 (position information of a face feature point after correction).

The detection result correcting unit 1050 verifies the detection accuracy of a face feature point detected for each frame image by comparing the coordinates of a face feature point detected for each frame image between the frame images. The detection result correcting unit 1050 performs a detection result correcting process of correcting the detection result of a face feature point detected by the face feature point detector 1030, by performing at least one of exclusion of a face feature point not satisfying a predetermined detection accuracy from the detection result and correction of the coordinates of a face feature point not satisfying a predetermined detection accuracy (S4 of FIG. 13).

Hereinafter, a detailed implementation method of a detection result correcting process performed by the detection result correcting unit 1050 will be described. The detection result correcting process may be broadly divided into the step of verifying detection accuracy and the step of excluding or correcting the frame that is determined to be low in accuracy as a result of the verification.

First, a detection accuracy verifying method will be described. It is assumed that when a person H is frame-tracked, a face detection result string $(x\_1, y\_1), \ldots, (x\_t, y\_t)$ and a feature point detection result string $p(1)$, $p(2), \ldots, p(t)$ are given. Herein, $p(1), p(2), \ldots, p(t)$ is a 2M-element vector corresponding to an array of x/y coordinate values of M face parts. At this time, a displacement $d(p(t), p(t-1))$ is calculated with respect to adjacent frames. When the displacement is greater than a threshold value θ, it is regarded as a detection failure and the detection result is removed. In this case, in addition to the adjacent frames, two or more frames other than the adjacent frames may be selected. For each part, an average value and a medium value are calculated with respect to consecutive frames r (r=1, ..., t). When the value is greater than a predetermined threshold value, it is regarded as a variation different from a factor by the movement of a person, and it is determined as coordinates that are low in detection accuracy. In addition, the displacement, even though it is Euclidean norm, even 1 norm, may be any distance. The scale may be adjusted according to the size of a face.

Figure 16:
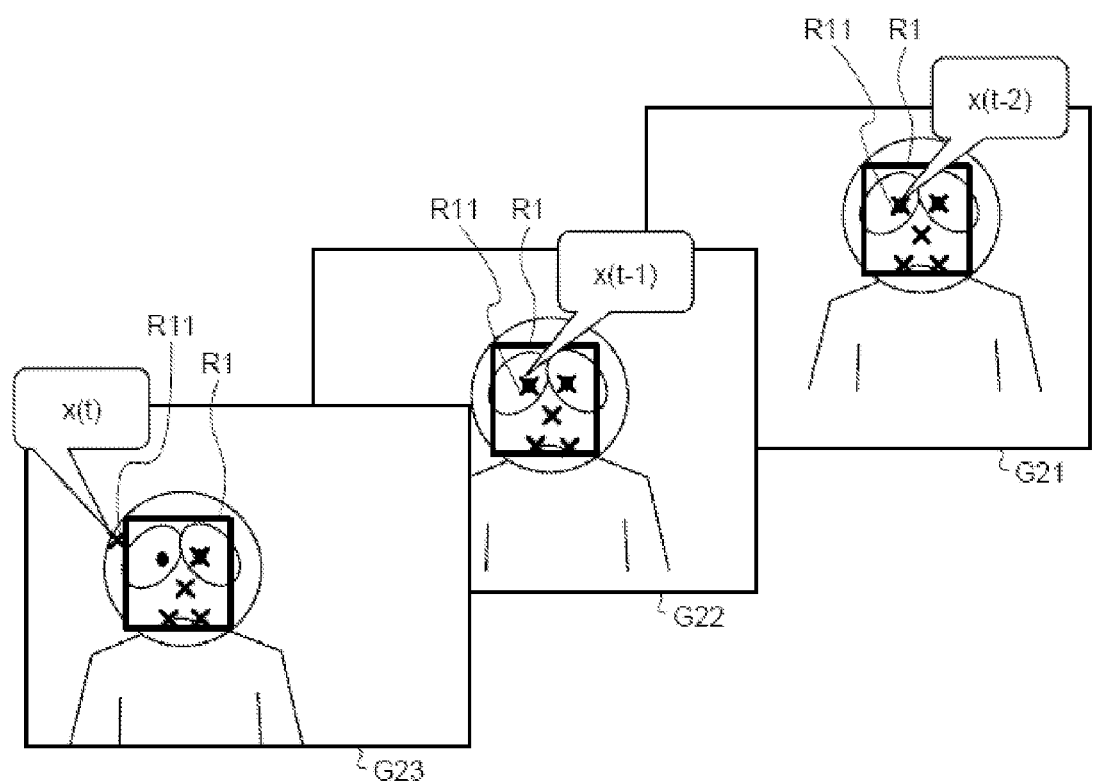
FIG. 16 is a conceptual diagram illustrating an example of a face feature point detected from each frame image, in the third embodiment.

FIG. 16 is a conceptual diagram illustrating an example of a face feature point detected from each of frame images G21 to G23. In the frame images G21 to G23 illustrated in FIG. 16, since a displacement of a feature point R11 of x(t) in a feature point R11 of x(t−2) to x(t) is large, it is regarded as a detection failure.

With respect to the frame determined to be low in detection accuracy in the previous step, exclusion or correction of the detection result is performed. For the exclusion of the detection result, one or both of the detection coordinates of the face region and the detection coordinates of a face feature point is/are not detected, information is excluded, and it is not output to the output unit 1060.

Figure 17:
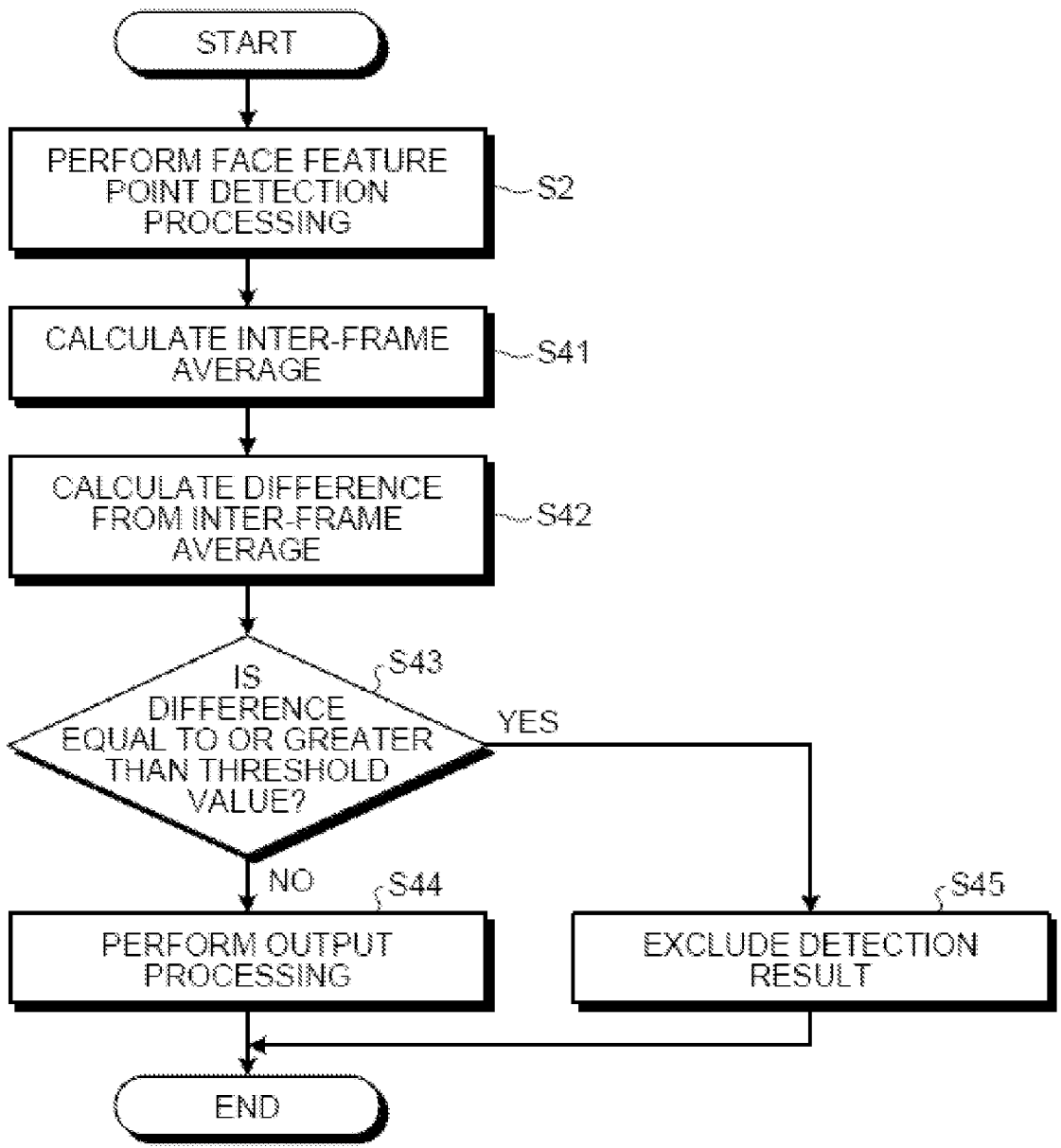
FIG. 17 is a flowchart illustrating an example of detection result correction processing in the third embodiment.

FIG. 17 is a flowchart illustrating an example of the detection result correcting process. More specifically, in the detection result correcting process in FIG. 17, if a difference between the coordinates of a face feature point detected in each frame image and an average value of the coordinates of face feature points detected from a plurality of frame images is greater than a predetermined value, the face feature point is determined as a face feature point not satisfying a predetermined detection accuracy.

As illustrated in FIG. 17, if a face feature point is detected by the face feature point detector 1030 (S2), the detection result correcting unit 1050 calculates an average between frames with respect to the coordinates of face feature points detected from a plurality of frame images (S41). Thereafter, the detection result correcting unit 1050 calculates a difference between the coordinates of a face feature point detected in each frame image and the average calculated in S41 (S42), and determines whether the difference is equal to or greater than a predetermined threshold value (S43).

If the difference is smaller than the predetermined threshold value (No in S43), the detection result correcting unit 1050 determines the detection of a face feature point is successfully performed, and outputs the detection result of the face feature point to the output unit 1060 (S44). If the difference is equal to or greater than the predetermined threshold value (Yes in S43), the detection result correcting unit 1050 determines the face feature point as a detection failure, and excludes the detection result of the face feature point (S45).

Figure 18:
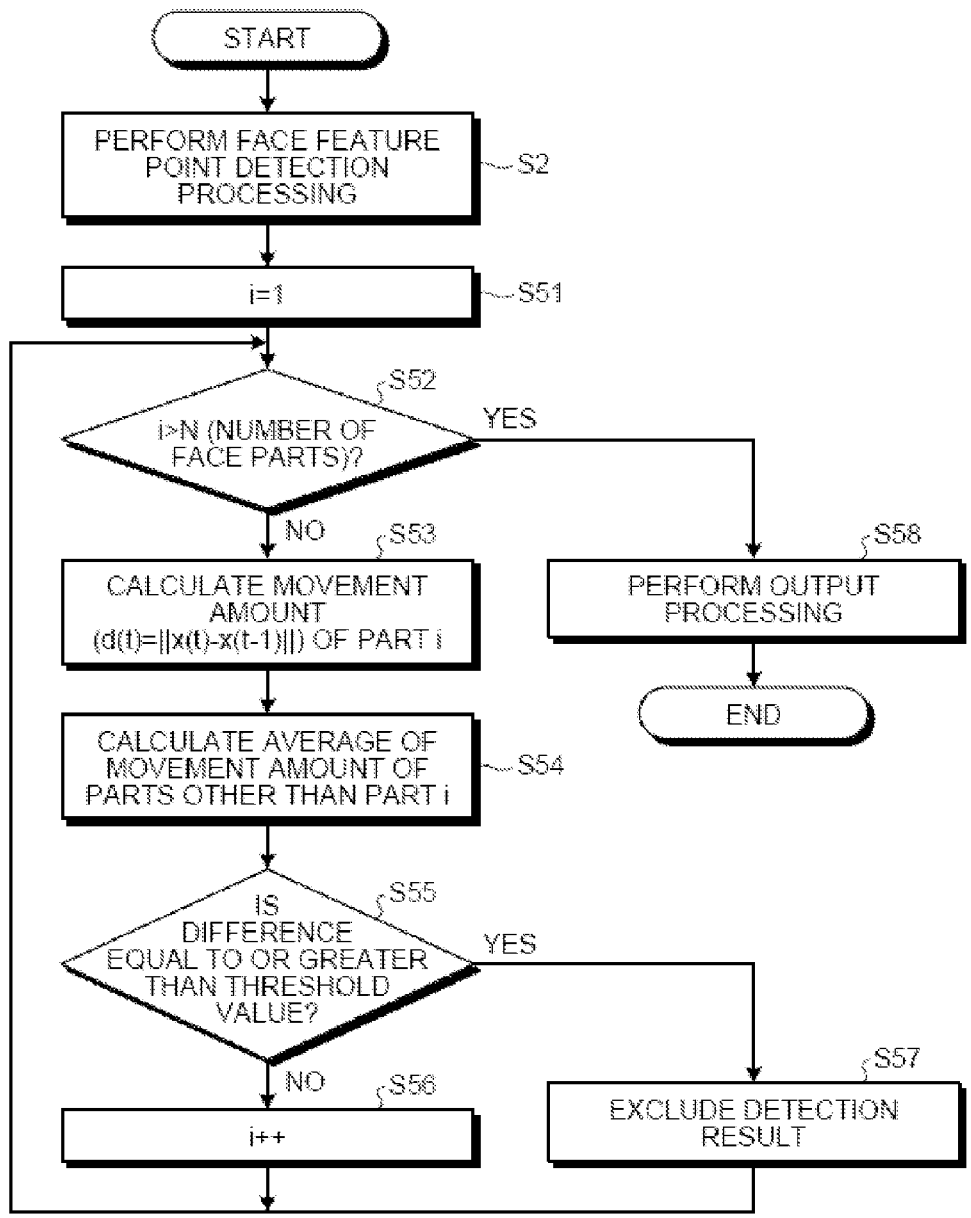
FIG. 18 is a flowchart illustrating an example of detection result correction processing in the third embodiment.

FIG. 18 is a flowchart illustrating an example of the detection result correcting process. More specifically, in the detection result correcting process in FIG. 18, if a movement between the coordinates of a face feature point detected in each frame image and the coordinates of a face feature point detected from the nearest frame image is greater than a predetermined value, a face feature point greater than a predetermined value is determined as a face feature point not satisfying the predetermined detection accuracy.

As illustrated in FIG. 18, if a face feature point is detected by the face feature point detector 1030 (S2), the detection result correcting unit 1050 initializes a parameter i for counting the number of face parts corresponding to face feature points (i=1) (S51), and performs S52 to S57 in each frame image until the count is greater than the number (N) of all face parts (i>N).

Specifically, the detection result correcting unit 1050 calculates a movement $(d(t)=\|x(t)-x(t-1)\|)$ from the nearest frame with respect to a part (i) of a face feature point (S53), and calculates an average of movements of the other parts other than the part (i) (S54). Thereafter, the detection result correcting unit 1050 determines whether a difference between the values calculated in S53 and S54 is equal to or greater than a predetermined threshold value (S55). If the difference is smaller than the predetermined threshold value (No in S55), the detection of the face feature point is successfully performed. Then, the parameter i is incremented (S56), and the process returns to S52. If the difference is equal to or greater than the predetermined threshold value (Yes in S55), it is determined that the detection of a face feature point is failed. Then, the detection result of the face feature point is excluded, the parameter i is incremented (S57), and the process returns to S52. After performance of the processing of S52 to S57 (Yes in S52), the detection result correcting unit 1050 outputs the detection results other than the detection result excluded in S57 to the output unit 1060 (S58).

Figure 19:
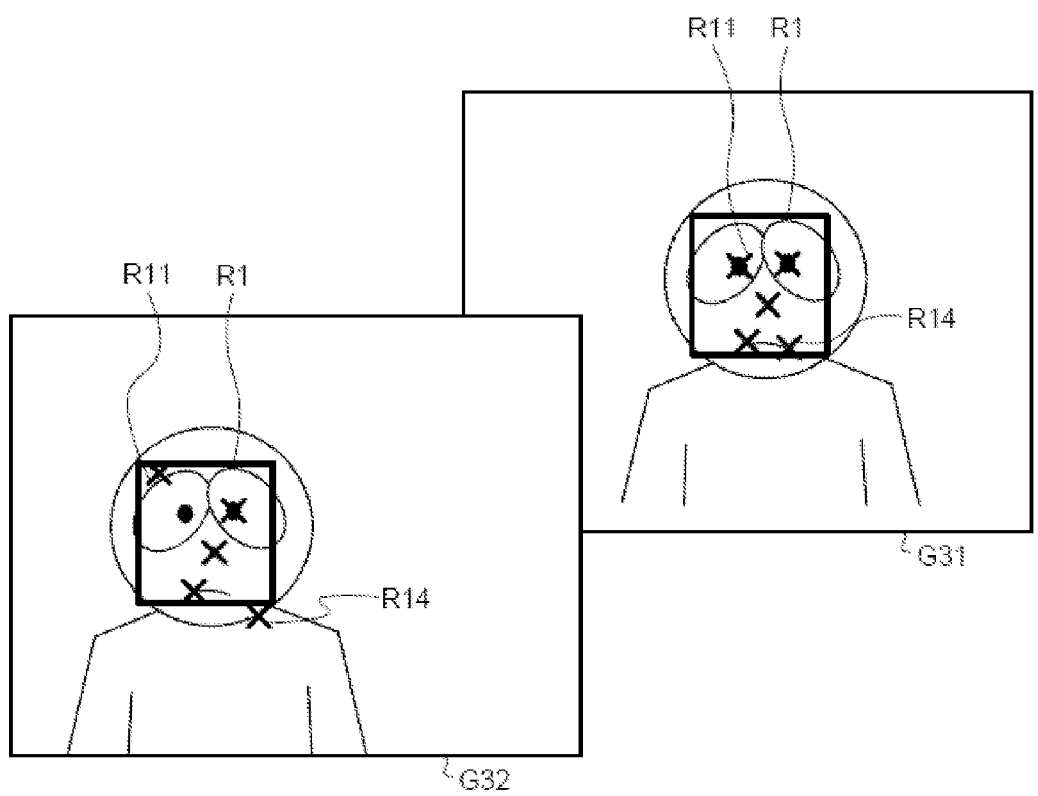
FIG. 19 is a conceptual diagram illustrating an example of a face feature point detected from each frame image in the third embodiment.

In addition, in the above-described detection result correcting process, in one frame image, if the number of face feature points determined as a detection failure is equal to or greater than a predetermined threshold value, all of the face feature points detected from the frame image may be corrected or excluded from the detection result. FIG. 19 is a conceptual diagram illustrating an example of a face feature point detected from each of frame images G31 and G32. As illustrated in FIG. 19, if two feature points R11 and R14 in the frame image G32 are determined as a detection failure, since a face image in the frame image G32 is unreliable due to noise mixing, the face feature point in the frame image G32 is corrected or excluded from the detection result.

Figure 20:
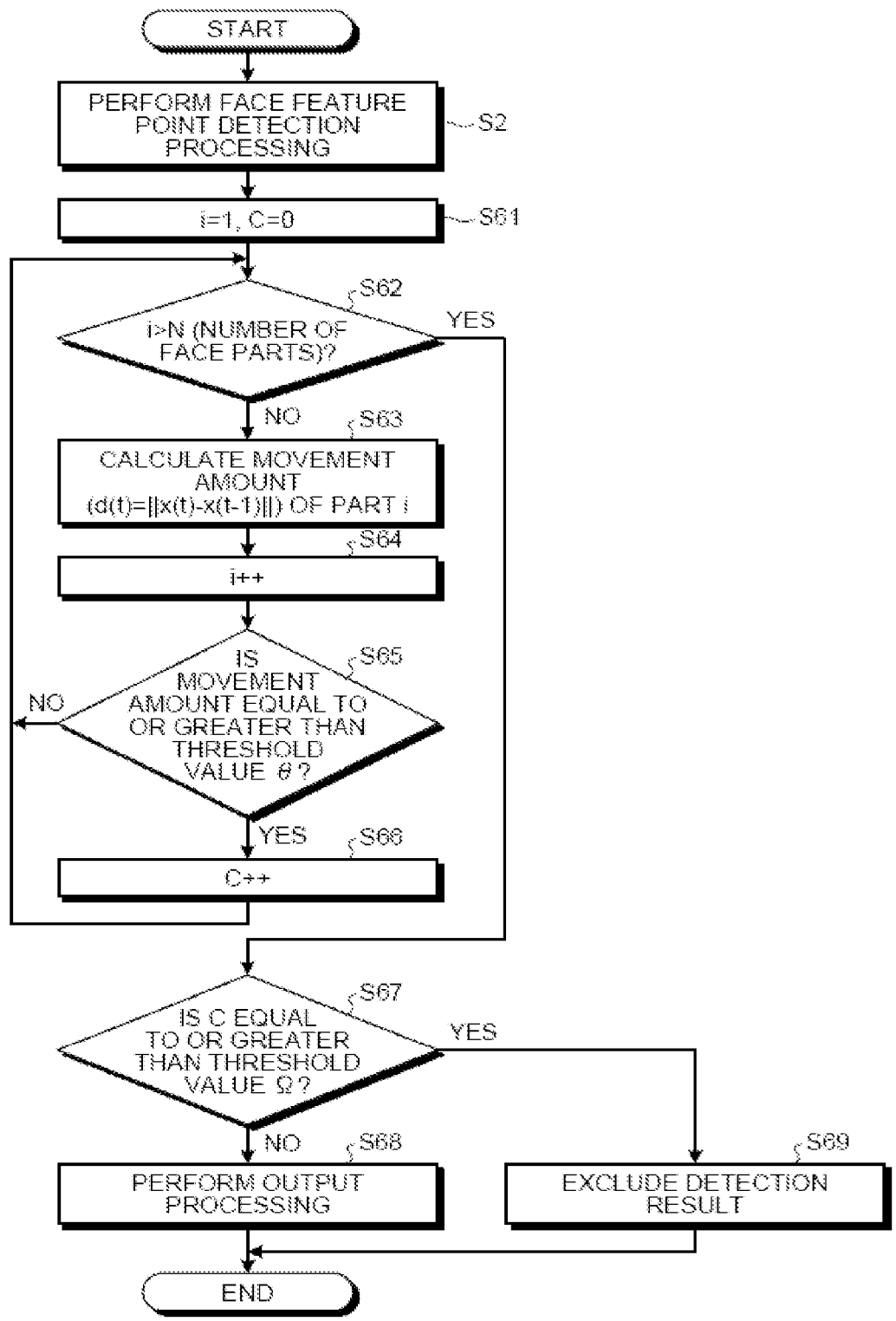
FIG. 20 is a flowchart illustrating an example of detection result correction processing in the third embodiment.

FIG. 20 is a flowchart illustrating an example of the detection result correcting process.

In the detection result correcting process of FIG. 20, if the number of face feature points determined as a detection failure is equal to or greater than a predetermined threshold value, all of the face feature points detected from the frame image are excluded from the detection result.

As illustrated in FIG. 20, if a face feature point is detected by the face feature point detector 1030 (S2), the detection result correcting unit 1050 initializes a parameter i for counting the number of face parts corresponding to face feature points (i=1) and initializes a parameter C for counting the number of face feature points determined as a detection failure (C=0) (S61), and performs S62 to S66 in each frame image until the count is greater than the number (N) of all face parts (i>N).

Specifically, the detection result correcting unit 1050 calculates a movement $(d(t)=\|x(t)-x(t-1)\|)$ from the nearest frame with respect to a part (i) of a face feature point (S63), increments the parameter i (S64), and determines whether the movement calculated in S63 is equal to or greater than a predetermined threshold value θ (S65). If the movement is equal to or greater than the predetermined threshold value θ (Yes in S65), the face feature point is determined as a detection failure. Then, the parameter C is incremented (S66), and the process returns to S62. If the movement is smaller than the predetermined threshold value θ (No in S65), the detection of the face feature point is determined as successfully performed. Then, the parameter C is not incremented, and the process returns to S62.

After performance of the processing of S62 to S66 (Yes in S62), the detection result correcting unit 1050 determines whether the parameter C is equal to or greater than a predetermined threshold value Ω, that is, whether the number of face feature points determined as a detection failure in a frame image is equal to or greater than the predetermined threshold value Ω (S67). If the parameter C is smaller than the predetermined threshold value Ω (No in S67), the detection result correcting unit 1050 outputs the face feature point detected from the frame image to the output unit 1060 (S68). If the parameter C is equal to or greater than the predetermined threshold value Ω (Yes in S67), the detection result correcting unit 1050 excludes the face feature point detected from the frame image, from the detection result (S69).

On the other hand, for detection result correction, the correction is performed by using information on the coordinates of face feature points or the face region coordinates of other frames corresponding to the same person. Specifically, in order to correct a coordinate value of a frame T, the frame T is predicted by adding a movement from a frame (T−2) to a frame (T−1) to the frame (T−1), or it may be implemented by a simple method of calculating an average value of the frames (T−1) and (T+1) (moving average) and obtaining the coordinates of the frame T. In addition, if a movement from the frame (t−2) to the frame (t−1) is observed, it can be predicted that it is present in the frame t in the event of a similar operation. If a face is detected in the frame t in the shape corresponding to the coordinates, correction is unnecessary. If a face is detected at an extremely-deviated position, it is determined that there is a possibility that the accuracy is low. In addition, although the use of two frames other than the frame T is illustrated in this description, the accuracy may be increased by increasing the number of frames or by performing nonlinear prediction instead of linear prediction.

Figure 21:
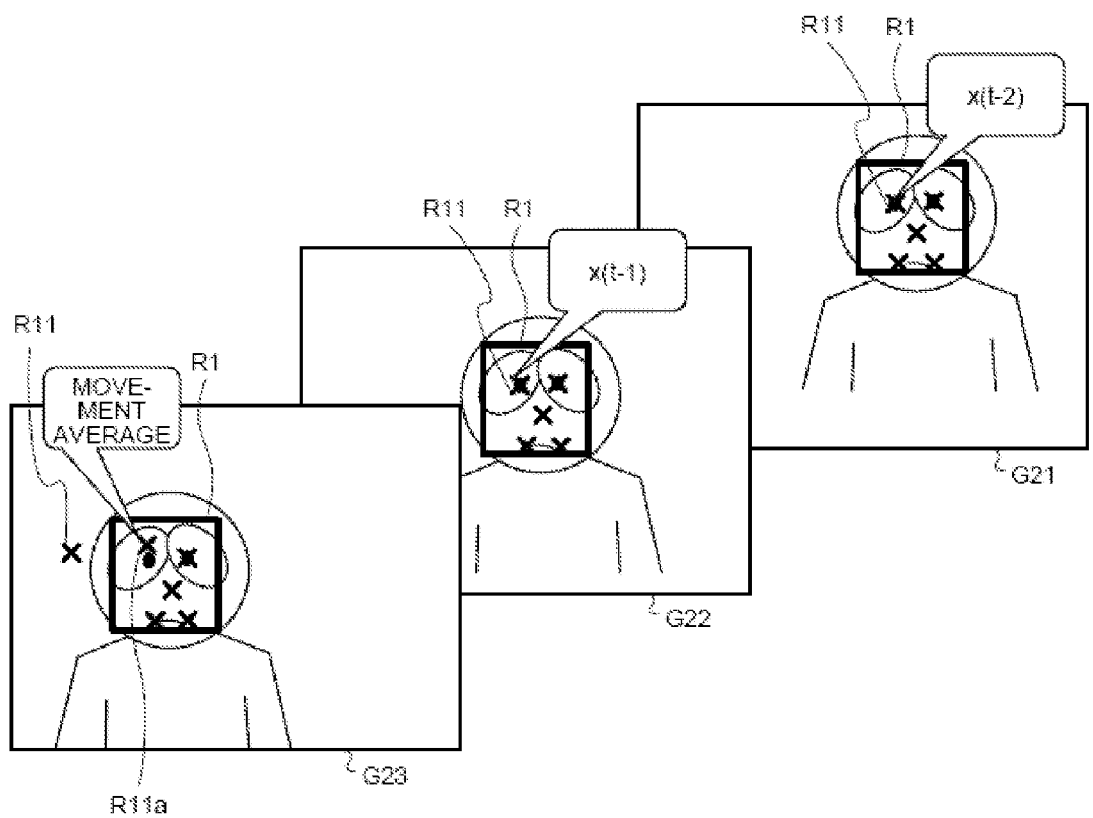
FIG. 21 is a conceptual diagram illustrating an example of the case of correcting a face feature point detected from each frame image by a moving average in the third embodiment.

FIG. 21 is a conceptual diagram illustrating an example of correcting a face feature point detected in each of the frame images G21 to G23 by a moving average. In the frame images G21 to G23 illustrated in FIG. 21, since a displacement of a feature point R11 of x(t) in a feature point R11 of x(t−2) to x(t) is large, it is regarded as a detection failure. The feature point R11 is corrected as a feature point R11a calculated based on the moving average of the feature point R11 detected in the frame images G21 and G22.

Figure 22:
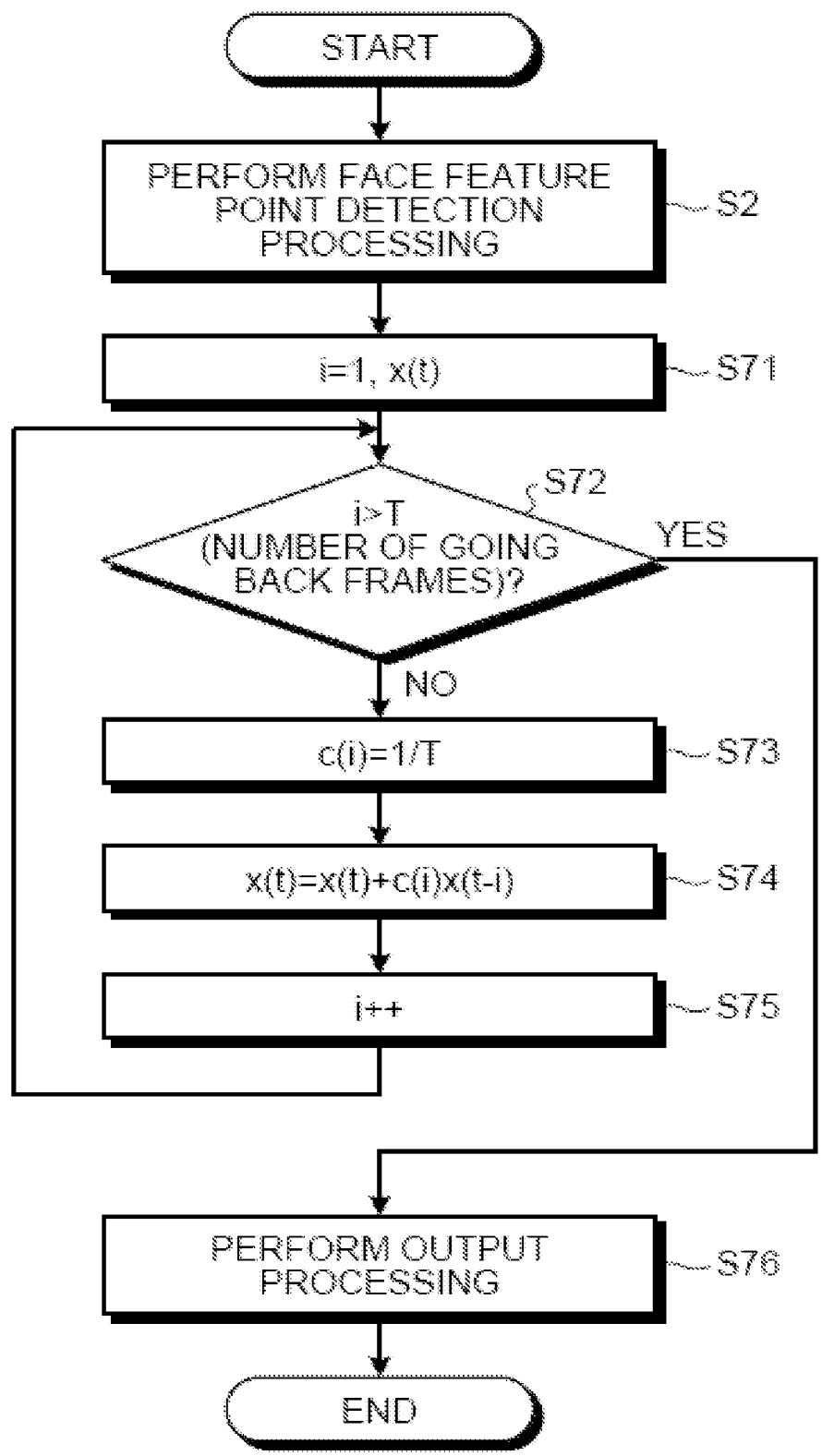
FIG. 22 is a flowchart illustrating an example of detection result correction processing in the case of correcting by a moving average in the third embodiment.

FIG. 22 is a flowchart illustrating an example of detection result correction processing in the case of correcting by a moving average. As illustrated in FIG. 22, if a face feature point is detected by the face feature point detector 1030 (S2), the detection result correcting unit 1050 initializes a parameter i for counting the number of return frames (i=1) and obtains a face feature point x(t) (S71), and performs S72 to S75 until it returns by the number (T) of frames (i>T).

Specifically, the detection result correcting unit 1050 calculates c(i)=1/T (S73), calculates a moving average $(x(t)=x(t)+c(t)\cdot x(t-1))$ of a face feature point between the return frames (S74), and increments the parameter i (S75). Then, the process returns to S72.

After performance of the processing of S72 to S75 (Yes in S72), the detection result correcting unit 1050 outputs the face feature point calculated by the moving average to the output unit 1060 (S76).

Also it can be realized in a way to predict the position of a face in time series by finding the difference between a model that assumes that the person is moving. Specifically, it can be implemented by using a time-series prediction technique such as a particle filter (D. MIKAMI, K. Otsuka, J. Yamato, Memory-based Particle Filter for Face Pose Tracking Robust under Complex Dynamics, CVPR 2009, pp. 999-1006), and ARMA model (M. H. Ghaeminia, A. H. Shabani, S. B. Shokouhi, Adaptive Motion Model for Human Tracking Using Particle Filter, ICPR 2010, pp. 2073-2076.)

It has been described above that the feature point coordinate correction process is performed regardless of the state of a face. However, the weight of an image used in the correction process may vary according to the direction of a face or the size of a face. For example, a plurality of face patterns with different directions may be prepared in advance, and it may be implemented by a simple method of determining a direction by using the matching with an input face pattern. If the direction with higher accuracy is required, a three-dimensional arrangement of an original face may be obtained from an arrangement on a two-dimensional image of a detected face feature point, and the direction of a face may be obtained in a similar technique.

Figure 23:
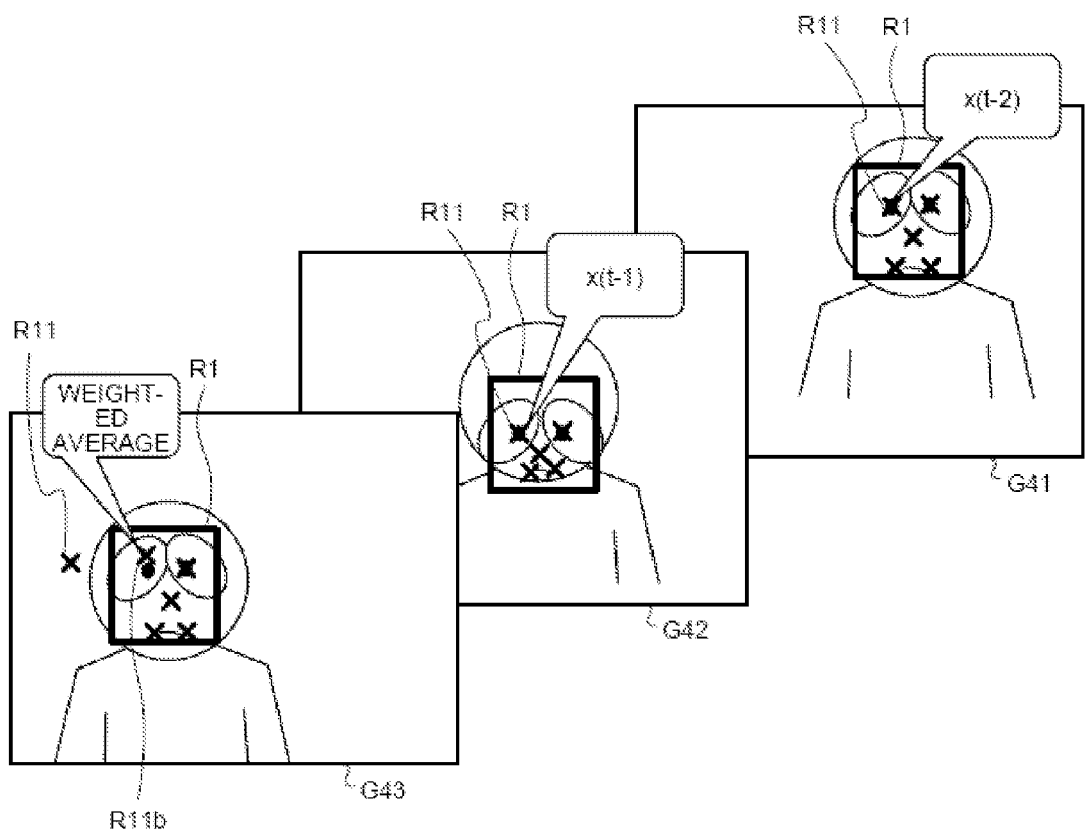
FIG. 23 is a conceptual diagram illustrating an example of the case of changing a weight value according to the direction of a face detected from each frame image in the third embodiment.

When the above feature point coordinates are corrected, the coordinates of a region displaying a face is used with high priority, and a place not displaying a face is used with low priority, thereby making it possible to increase the image quality. FIG. 23 is a conceptual diagram illustrating an example of the case of changing a weight value according to a direction of a face detected from each of the frame images G41 to G43. For example, as illustrated in FIG. 23, since there is a case where a face is oriented down as in the frame image G42 according to a walking position during one step of walking, a visible region in a face is different. In this case, if a person comes forward, an upper region of a face may be preferentially used, but a lower region of the face which is difficult to see due to the influence of a depression angle (such as mouth, jaw, and nostril) may not be actively used. In other words, the weighting of a feature point R11 detected in the frame image G41 is increased, and the weighting of a feature point R11 detected in the frame image G42 is reduced. Then, a feature point R11 of the frame image G43 determined as a detection failure is corrected as a feature point R11b obtained from a weighted average. Also, in addition to the influence of the depression angle, whenever the direction of a face of a person changes while the person looks around, a high-priority region and a low-priority region may be switched, thereby avoiding the degradation of coordinate detection accuracy. In the above description, it may be implemented by averaging a weight and changing a calculation into a weighted average.

Figure 24:
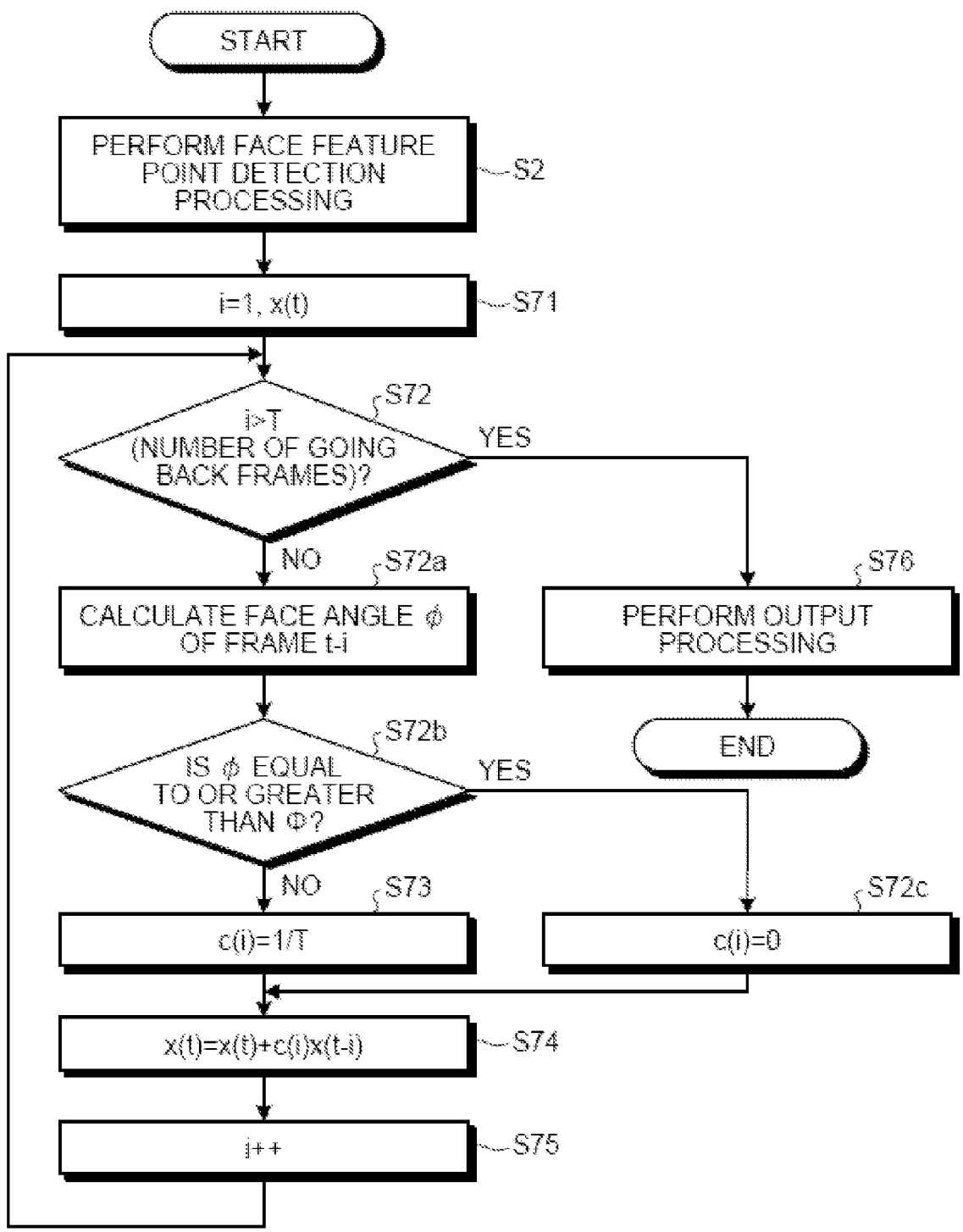
FIG. 24 is a flowchart illustrating an example of detection result correction processing in the case of changing a weight value in the third embodiment.

FIG. 24 is a flowchart illustrating an example of detection result correction processing in the case of changing a weight value. As illustrated in FIG. 24, after the aforementioned "NO" at S72, the detection result correcting unit 1050 calculates a face angle φ of a frame (t–i) based on the coordinates of a face feature point included in the frame (S72a). Thereafter, the detection result correcting unit 1050 determines whether the face angle φ calculated in S72a is equal to or greater than a predetermined threshold value Φ, for example, whether a face is looking down (S72b).

When the face angle φ is smaller than the predetermined threshold value Φ (No in S72b), for example, since the face is facing toward the front, the detection result correcting unit 1050 calculates a moving average with an original value (weight: 1) (S73 to S75). When the face angle φ is equal to or greater than the predetermined threshold value Φ (Yes in S72b), for example, since the face is looking down, the detection result correcting unit 1050 sets c(i)=0 (weight: 0)(S72c) and calculates a moving average (S74 and S75).

Return to the description with reference to FIGS. 11 and 13. In the present embodiment, regarding a result obtained from the detection result correcting unit 1050, with respect to an image from the camera 1500 displaying the result on a display 1064 such as a liquid crystal monitor or a CRT monitor, the output unit 1060 outputs the face detection result by overlay-displaying rectangular information representing a face region. Also, as a system, together with position information in an image of face detection or face feature point detection, a region including a face image or an entire input image may be extracted and stored.

Also, although an application of detecting a face from an image and displaying and the storing the same has been described, the system may be extended and applied to improve the accuracy of matching a person's face image. The basic configuration thereof comprises the feature extractor 1061, a person information managing unit 1062, a recognizing unit 1063, and the display 1064.

The feature extractor 1061 outputs feature information (hereinafter, "face feature" refers to feature information for identification of a person) for identification of a person from face region information (face feature point output through the detection result correcting unit 1050) as numerical values. First, a face region is extracted to a predetermined size and in a predetermined shape based on the position of a face part detected by the face detector 1020, and shading information thereof is used as a feature amount. Herein, a shading value of an m×n pixel region is used as information, and the m×n-dimensional information is used as a feature vector. Specifically, the vector and a length of the vector are normalized to 1 by a simple similarity method, and an inner product is calculated to obtain a similarity degree representing a similarity between feature vectors. In detail, it is implemented by using a subspace method as described in the literature (Written by Erkki Oja and Translated by OGAWA Hidemitsu and SATO Makoto, "Pattern Recognition and Subspace Method", Industrial Book (Sangyotosho), 1986).

A technique of improving an accuracy by generating an image by intentionally changing the direction or state of a face by using a model with respect to a piece of face image information, which is described in a literature (TOSHIBA (KOZAKAYA Tatsuo): "Image Recognizing Apparatus, Method and Program", JP 2007-4767 A), may also be applied. When a face feature is obtained from one image, face feature extraction is completed by the above process. On the other hand, higher-accuracy recognition processing may be performed by performing calculation based on a video image by using a plurality of consecutive images with respect to the same person. Specifically, a mutual subspace method described in the literature (FUKUI Kazuhiro, YAMAGUCHI Osamu, MAEDA Kenichi: "Face Recognizing System Using Video Image", the institute of electronics information and communication engineers Research Report PRMU, vol. 97, No. 113, pp. 17-24 (1997)) or the literature (MAEDA Kenichi, WATANABE Sataichi: "Pattern Matching Method Using Local Structure", the institute of electronics information and communication engineers Journal (D), vol. J68-D, No. 3, pp. 345-352 (1985)) may be used.

Like the face feature point detector 1030, the feature extractor 1061 extracts an m×n pixel image from an image obtained sequentially from the image input unit 1010, calculates a correlation matrix of a feature vector from the data, obtains an orthonormal vector by K-L development, and calculates a subspace representing a face feature obtained from consecutive images. The subspace may be calculated by obtaining a correlation matrix (or covariance matrix) of the feature vector and obtaining an orthonormal vector (eigen vector) by K-L development thereof. A k number of eigen vectors corresponding to eigen values are selected in descending order of eigen value, and the subspace is expressed by using a set of selected eigen vectors. In the present embodiment, a correlation matrix Cd is obtained from a feature vector and diagonalized with a correlation matrix Cd=ΦdAdΦdT, thereby obtaining a matrix Φ of an eigen vector. This information is a subspace representing a face feature of a person to be currently recognized. Feature information such as the subspace output by such a method is referred to as person feature information on a face detected from an input image.

The person information managing unit 1062 is a database that is used to search by the recognizing unit 1063 to be described later. The person information managing unit 1062 manages the face feature information output from the feature extractor 1061 in each person that is a target to be searched, and additional information on a person such as attribute information such as the sex, age, height of a person, which can be determined by an attribute determining means, corresponding to the same person. The contents that are actually managed as face feature information and attribute feature information may be data output from the feature extractor 1061, or may be an m×n feature vector, a subspace, or a correlation matrix immediately before the performance of KL development. In addition, the feature information output from the feature extractor 1061 is managed together with a face image input from the image input unit 1010 for registration, so that it can be used for search of a person or display of search. In addition, it is also possible to specify the priority of search results by specifying the presence or absence of careful handling, which will be described later.

The recognizing unit 1063 calculates a similarity between the face feature information of the input image obtained by the feature extractor 1061 and the face feature information stored in the corresponding person information managing unit 1062, and returns the results in descending order of similarity. Also, as described in the person information managing unit 1062, it is also possible to search only a portion of the person information managing unit 1062, narrowing to predetermined attribute information. In this case, as the search processing results, a person ID managed by the person information managing unit 1062 in descending order of similarity for identification of a person, and an index indicating the similarity that is the calculation result, are returned. In addition, information managed for each person by the person information managing unit 1062 may be returned together. However, since it can be basically matched by an identification ID, the search processing can be implemented without exchange of additional information.

An index indicating similarity is a similarity degree between subspaces managed as face feature information. As the calculation method, a subspace method, a multiple similarity method, or the like may be used. In this method, recognition data among pre-stored registration information and input data may be represented by a subspace calculated from a plurality of images, and an angle between two subspaces is defined as a similarity degree. Herein, an input subspace is called an input means space. With respect to an input data stream, likewise, a correlation matrix Cin is calculated and diagonalized with $Cin=\Phi in \Lambda in \Phi inT$, and an eigen vector $\Phi in$ is calculated. A similarity (0.0 to 1.0) between two subspaces represented by $\Phi in$ and $\Phi d$ is calculated and used as a similarity for recognition.

A specific calculation method may be implemented by the literature (Erkki Oja) described with respect to the feature extractor 1061. Also, a plurality of face images corresponding to the same person may be pre-arranged and projected onto a subspace for identification to improve identification accuracy, and the same processing may be performed by the literature (FUKUI•KOZAKAYA). A search method using a TREE structure may be used for high-speed search.

The display 1064 may include one or both of a real-time face search result display for displaying the result in real time according with a designated condition among the results searched by the recognizing unit 1063, and an off-line face search result display for retaining the result searched by the recognizing unit 1063 as a search history, designating a condition later, and displaying only the search history.

From the above, when a face of a person H is detected from an image captured by the camera 1500 installed in a high place for monitoring, the face recognizing apparatus 1000 according to the present embodiment verifies the detection accuracy of a face feature point detected in each frame image by comparing the coordinates of a face feature point detected in each frame image between the frame images, and corrects the detection result of a detected face feature point by performing at least one of excluding a face feature point not satisfying a predetermined detection accuracy from the detection result and correcting the coordinates of a face feature point not satisfying a predetermined detection accuracy. Accordingly, the accuracy of face detection or face feature point detection can be improved.

Figure 25:
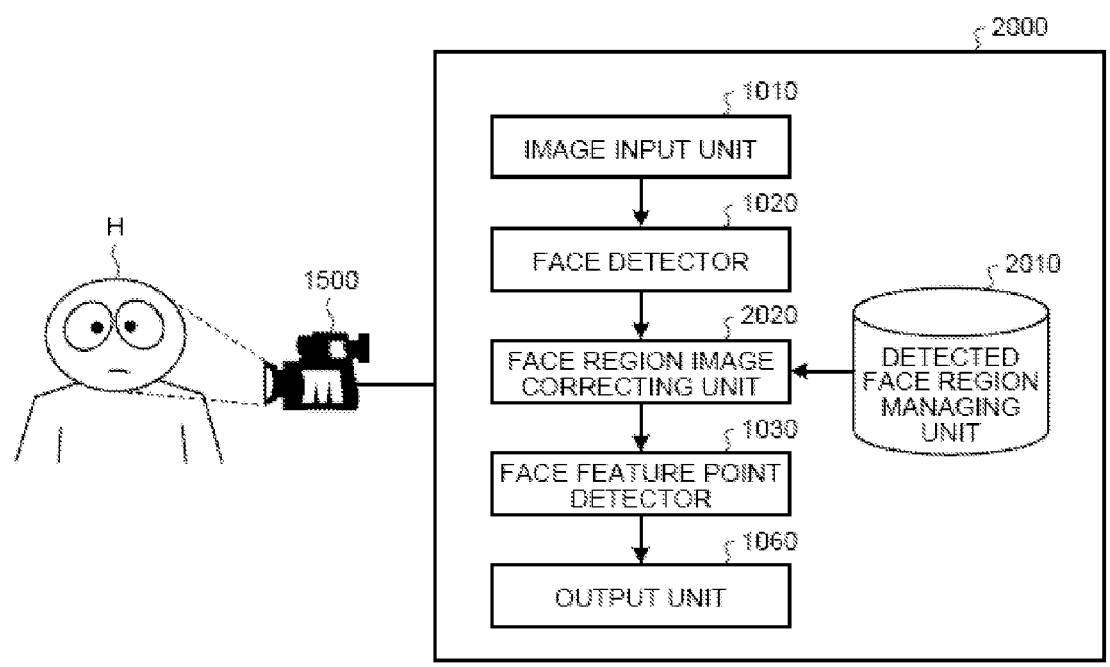
FIG. 25 is a block diagram illustrating an example of a configuration of a face recognizing apparatus according to a fourth embodiment.

FIG. 25 is a block diagram illustrating an example of a configuration of a face recognizing apparatus 2000 according to a fourth embodiment. As illustrated in FIG. 25, the face recognizing apparatus 2000 comprises a detected face region managing unit 2010 and a face region image correcting unit 2020 that are configured to perform processing between the face detector 1020 and the face feature point detector 1030.

The detected face region managing unit 2010 is a database that is used by the face region image correcting unit 2020 to be described later, and is a database that stores face position information obtained by the face detector 1020, information matching the walks of the same person between frames obtained by a tracking process, face image information, background image information, and other information such as time and place. As management information, a feature amount after application of feature extraction processing for a matching process or the like may be stored. Also, when a person is covered with a mask, sunglasses, or other persons, information thereof may be stored.

With reference to the detected face region managing unit 2010, based on a plurality of face images corresponding to face regions detected over a plurality of frame images, the face region image correcting unit 2020 corrects the image quality of a face region detected from a predetermined frame image. Specifically, the face region image correcting unit 2020 selects one or more frame images according to each image to be processed from a series of face images and a face detection result matched and tracked over a plurality of frames generated by capturing a series of walks of the same person by the face detector 1020, and corrects the quality of an image by using different frame images captured in the same manner.

Specifically, as illustrated in FIG. 12, processing such as image correction or combination is performed by using the feature of a face viewed to a small size at a place remote from the camera 1500 and the feature of a face viewed to a large size at a place close to the camera. Herein, a processing target may be all of the input frame images, or may be at least one frame image selected from the group of a frame image that is easiest to see as a face region image from a plurality of frame images, a large-sized frame image, and a frame image with a face oriented toward the front, and it is determined whether correction of an extracted frame image is necessary.

Frame image quality determination targets are the brightness of a face region image, the contrast of a face region image, the presence/absence of noise in a face region image, the size (resolution) of a face region image, and the blur degree of a face region image. The brightness may be determined by taking a histogram of the luminance value of a face region to find an average value thereof or taking the average value of a luminance included within a predetermined standard deviation from an average value. When the above value is higher than a predetermined upper limit threshold value, it is determined as 'too bright'; and when the above value is lower than a predetermined lower limit threshold value, it is determined as 'too dark', and a correction is made. Likewise, the contrast may be obtained by creating a histogram of a luminance value of a face region and calculating a variance of a luminance value. The difference of luminance values may be taken by taking the brightest value and dark values while removing the outliers. Regarding the noise, a frequency component of a face region image is obtained by FFT, and it is determined that a noise is high when a frequency component equal to or more than a predetermined threshold value is strong. The size may be the size of a face region image. Regarding the blur degree, contrary to noise determination, a face region image is FFT-processed, and it may be determined as a blur when the strength of a high frequency component is lower than a predetermined threshold value. By calculating and obtaining the distribution of several luminance values in this manner, whether a correction is necessary can be determined, and this determination may be performed on at least one or all of them.

As image correction processing performed when necessary as a result of the above quality determination, any processing may be applicable as long as it is processing correctable using a plurality of images. Specifically, processings such as enhancing the resolution of a face region image (high-resolution (super-resolution) processing), removal of a noise, expansion of luminance gradation, and correction of a blur state may be applicable. In the present embodiment, it will be apparent that at least one of these processings may be applicable, or all of these processings may be simultaneously applicable.

The high-resolution (super-resolution) processing is processing that matches a corresponding point between a plurality of frames that are not temporally apart from each other, and then combines images with higher resolution more smoothly by using luminance value information of pixels considered to correspond to the same position.

Specifically, it may be implemented by applying high-resolution processing such as S. C. Park, M. K. Park, and M. G. Kang., "Super-resolution image reconstruction: a technical overview", IEEE Signal Processing Magazine, 20(3):21-36, May 2003. Also, in this case, a positing matching process between a plurality of frames is important information. Therefore, when a frame used in high-resolution processing is determined, position information of face detection is used. When a movement amount of a face between frames is equal to or smaller than a predetermined threshold value φ, it is not used in superposition. On the other hand, when the movement amount is equal to or greater than the predetermined threshold value Φ, a variation is large. In this case, since a detection is a false detection or an error in superposition is large, it is determined not to be used in high-resolution processing.

Like the high-resolution processing, the noise removal may be performed by matching the coordinates over a plurality of frames to match pixels corresponding to the same place of an image region of a person, and taking information such as an average value and a medium value after removal of an average value or an outlier between a plurality of frames based on the assumption that luminance or color information is nearly equivalent in the same part of the face region.

Regarding the expansion of luminance gradation, when the exposures of a plurality of images are different, these may be combined to perform high-gradation processing (for example, Paul E. Debevec Jitendra Malik: Recovering High Dynamic Range Radiance Maps from Photographs, SIGGRAPH 1997.)

Regarding the correction of brightness, after performing the same processing as in the expansion of luminance gradation, when it is too bright, luminance information of a dark-gradation side is used; and when it is too dark, luminance information of a bright-gradation side is used. Likewise, regarding the correction of a blur, after performing position matching in a plurality of frames, when it is a region of weak edge information (when an edge strength is smaller than a predetermined threshold value), the value is used without change or an average value of luminance or color information over a plurality of frames is taken. When the edge strength is equal to or greater than the predetermined threshold value, the average value is not taken and information of a frame with a strong edge is used. Also, edge enhancement processing is performed while removing a noise from a plurality of frames. Accordingly, the blur of a blurred image can be reduced by using a plurality of frames.

It has been described above that these correction processings are performed regardless of the state of a face. However, the weight of an image used in the correction processings may vary according to the direction of a face or the size of a face in a similar way to the second embodiment. When the above image quality is corrected, the coordinates of a region displaying a face is used with high priority, and a place not displaying a face is used with low priority, thereby making it possible to increase the image quality. For example, during one step of walking, as illustrated in FIG. 12, a visible region in a face varies according to walking positions. In this case, when a person comes forward, an upper region of a face may be preferentially used, but a lower region of the face which is difficult to see due to the influence of the depression angle (such as mouth, jaw, and nostril) may not be actively used. Also, in addition to the influence of the depression angle, whenever the direction of a face of a person changes while the person looks around, a high-priority region and a low-priority region may be switched, thereby avoiding the degradation of quality.

Also, in these correction processings, whether to perform correction may be switched by determining the quality of an input image, and a face region having a higher quality than the input image may be obtained according to the input image.

Figure 26:
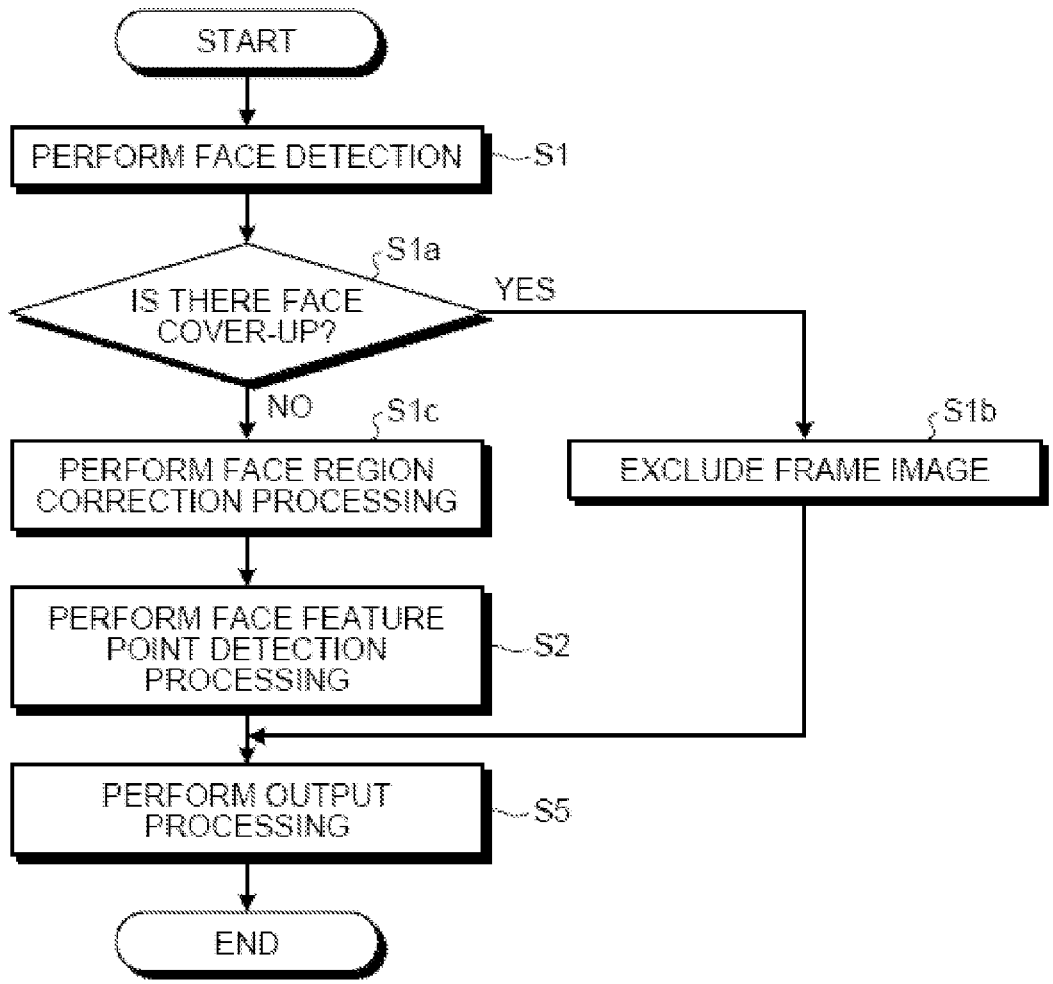
FIG. 26 is a flowchart illustrating an example of an operation of a face recognizing apparatus in the fourth embodiment.

FIG. 26 is a flow chart illustrating an example of an operation of the face recognizing apparatus 2000 according to the fourth embodiment. As illustrated in FIG. 26, the face region image correcting unit 2020 determines whether there is a face cover-up, based on the detection result of the face detector 1020 (S1a). When there is a face cover-up (Yes in S1a), the frame image is excluded from the above-described face region correction processing (S1b). When there is no face cover-up (No in S1a), the face region image correcting unit 2020 performs the above-described face region correction processing (S1c). Thereafter, the face feature point detector 1030 detects a face feature point by using a frame image in which a face region is corrected (S2), and performs output processing to the output unit 1060 (S5). Accordingly, high-accuracy feature point detection can be performed and the image quality of a stored image can be improved.

Figure 27:
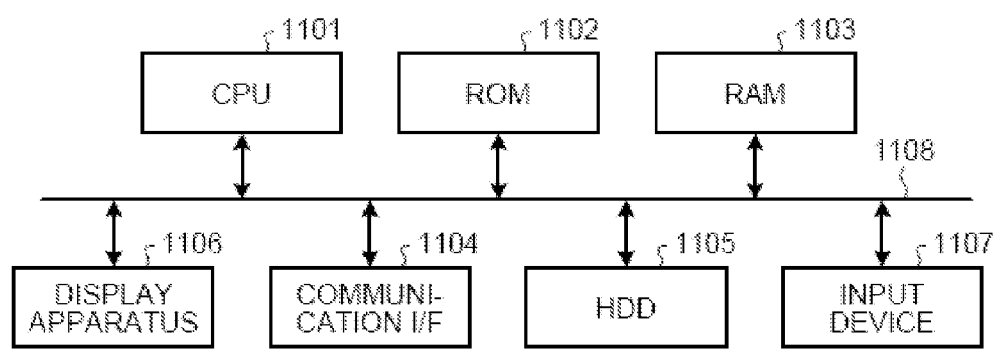
FIG. 27 is an exemplary block diagram illustrating a hardware configuration of a face recognizing apparatus in the first, second, third and fourth embodiments.

FIG. 27 is a diagram illustrating a hardware configuration of the face recognizing apparatuses 100, 900, 1000 and 2000 according to the first, second, third and fourth embodiments. As illustrated in FIG. 27, the face recognizing apparatuses 100, 900, 1000 and 2000 comprise a CPU 1101, a ROM (read only memory) 1102, a RAM (random access memory) 1103, a communication I/F 1104, an HDD 1105, a display apparatus 1106, an input device 1107 such as a keyboard and a mouse, and a bus 1108 connected therebetween, and have a general computer-based hardware configuration.

A face recognizing program executed in the face recognizing apparatuses 100, 900, 1000 and 2000 according to the present embodiment may be recorded and provided in the form of an installable file or an executable file on a computer-readable recording medium such as CD-ROM, flexible disk (FD), CD-R, or DVD (digital versatile disk).

Also, the face recognizing program executed in the face recognizing apparatuses 100, 900, 1000 and 2000 according to the present embodiment may be provided by being stored on a computer connected to a network such as the Internet and then downloaded through the network. Also, the face recognizing program executed in the face recognizing apparatuses 100, 900, 1000 and 2000 according to the present embodiment may be provided or distributed through a network such as the Internet. Also, the face recognizing program according to the present embodiment may be provided by being pre-stored in a ROM or the like.

The face recognizing program executed in the face recognizing apparatuses 100, 900, 1000 and 2000 according to the present embodiment has a module configuration including the above-described respective configurations. In an actual hardware configuration, when the CPU 1101 reads the face recognizing program from the above storage medium and executes the same, the respective configurations are loaded and created on the RAM 1103.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A face recognizing apparatus comprising:
a storage that stores face feature information on a face feature of each person;
at least one processor
that receives image information including at least a face of a person that is walking;
that detects a face region of the face of the person from the image information received;
that extracts face feature information on a face feature from the face region detected;
that recognizes the person in the image information received based on the feature information extracted and the face feature information stored in the storage,
wherein the at least one processor
receives video data,
detects, from the input video data, a face region of a face of a same person over a plurality of frame images,
detects a face feature point for each of the frame images from the face region detected over the frame images,
verifies a detection accuracy of the face feature point detected for each of the frame images by comparing coordinates of the face feature point detected for one of the frame images and coordinates of the face feature point detected for another one of the frame images, and corrects a detection result of the detected face feature point by performing at least one of exclusion of a face feature point failing to satisfy a predetermined detection accuracy from the detection result and correction of the coordinates of the face feature point failing to satisfy the predetermined detection accuracy, and
recognizes the same person with reference to the face feature information based on the corrected detection result of the face feature point,
wherein the at least one processor calculates a moving average of coordinates of the face feature points detected for the frame images, and corrects the coordinates of a face feature point failing to satisfy the predetermined detection accuracy based on the calculated moving average,
wherein the at least one processor calculates a direction of a face detected based on the face feature point detected for each of the frame images, calculates a face angle based on the direction of the face for each of the frame images, and calculates a weight value used to calculate the moving average,
wherein, when the face angle for a particular frame image falls below a threshold, the processor determines that the direction of the face has changed from being oriented toward a frontal direction to being oriented toward a non-frontal direction, and in response, decreases the weight value for face feature points in the particular frame image, thereby changing the calculated moving average,
wherein the at least one processor sets the weight value for a region displaying the face to a higher value than the weight value for a region not displaying the face.

2. The face recognizing apparatus according to claim 1, wherein, if a difference between coordinates of the face feature point detected for one of the frame images and an average value of coordinates of face feature points detected for the frame images is greater than a predetermined value, the at least one processor determines the face feature point as failing to satisfy a predetermined detection accuracy.

3. The face recognizing apparatus according to claim 1, wherein, if a movement amount between coordinates of the face feature point detected for one of the frame images and coordinates of a face feature point detected for the nearest frame image is greater than a predetermined value, the at least one processor determines the face feature point as failing to satisfy a predetermined detection accuracy.

4. The face recognizing apparatus according to claim 1, wherein
the at least one processor corrects image quality of a face region detected from a predetermined frame image based on a plurality of face images of the face regions detected over the frame images,
detects a face feature point for each of the frame images based on the face region detected over the frame images and the face region of which the image quality is corrected, and
recognizes the same person with reference to the face feature information based on the detected face feature point.

5. The face recognizing apparatus according to claim 4, wherein the at least one processor performs at least one of enhancing the resolution of a face region detected from the predetermined frame image, noise removal, luminance correction, brightness correction, and edge enhancement.

6. The face recognizing apparatus of claim 1, wherein the at least one processor retains a plurality of detecting techniques differing from each other in roughness of detection processing, each of the detecting techniques being for detecting a face feature from the face region detected,
extracts, by at least one of the detecting techniques retained, the face feature information on the face feature from the face region detected.

7. The face recognizing apparatus of claim 6, wherein the at least one processor selects the at least one of the detecting techniques retained based on a resolution of the face region detected,
the at least one processor extracts, by the at least one of the detecting techniques selected, the face feature information from the face region detected.

8. The face recognizing apparatus of claim 6, wherein the at least one processor determines whether the face feature detected by one of the detecting techniques retained satisfies a condition based on an average face pattern, and, if it is determined that the detected face feature does not satisfy the condition, extracts the face feature information by other one of the detecting techniques which is coarser in detection processing than the one of the detecting techniques.

9. The face recognizing apparatus of claim 6, wherein the at least one processor detects a position of the face feature from the face region detected by a first detecting technique of the detecting techniques retained, and extracts the face feature information from a region around the detected position by a second detecting technique of the detecting techniques which is finer in detection processing than the first detecting technique.

10. The face recognizing apparatus of claim 9, wherein the at least one processor detects the position of the face feature by the first detecting technique, determines whether the detected position satisfies a predetermined condition, and, if it is determined that the detected position does not satisfy the predetermined condition, performs detection processing by the second detecting technique.

11. The face recognizing apparatus of claim 6, wherein the at least one processor displays, upon displaying information of the person recognized, information about face recognition reliability which is based on the at least one of the detecting techniques.

12. A face recognizing method comprising:
receiving image information including at least a face of a person that is walking;
detecting a face region of the face of the person from the received image information;
extracting face feature information on a face feature from the detected face region; and
recognizing the person in the received image information based on the extracted feature information and face feature information indicating a feature of a face of each person, wherein
the receiving includes receiving video data,
the detecting includes detecting, from the input video data, a face region of a face of a same person over a plurality of frame images,
the detecting includes detecting a face feature point for each of the frame images from the face region detected over the frame images,
the method further comprises verifying a detection accuracy of the face feature point detected for each of the frame images by comparing coordinates of the face feature point detected for one of the frame images and coordinates of the face feature point detected for another one of the frame images, and correcting a detection result of the detected face feature point by performing at least one of exclusion of a face feature point failing to satisfy a predetermined detection accuracy from the detection result and correction of the coordinates of the face feature point failing to satisfy the predetermined detection accuracy,
the recognizing includes recognizing the same person with reference to the face feature information based on the corrected detection result of the face feature point,
wherein the method further comprises:
calculating a moving average of coordinates of the face feature points detected for the frame images, and correcting the coordinates of a face feature point failing to satisfy the predetermined detection accuracy based on the calculated moving average,
calculating a direction of a face detected based on the face feature point detected for each of the frame images,
calculating a face angle based on the direction of the face for each of the frame images,
calculating a weight value used to calculate the moving average, and
when the face angle for a particular frame image falls below a threshold, determining that the direction of the face has changed from being oriented toward a frontal direction to being oriented toward a non-frontal direction, and in response, decreasing the weight value for face feature points in the particular frame image, thereby changing the calculated moving average,
wherein the weight value for a region displaying the face is set to a higher value than the weight value for a region not displaying the face.

\* \* \* \* \*